United States Patent
Deng et al.

(10) Patent No.: US 10,255,520 B2
(45) Date of Patent: Apr. 9, 2019

(54) SYSTEM AND METHOD FOR AIRCRAFT DOCKING GUIDANCE AND AIRCRAFT TYPE IDENTIFICATION

(71) Applicants: SHENZHEN CIMC-TIANDA AIRPORT SUPPORT LTD., Guangdong (CN); CHINA INTERNATIONAL MARINE CONTAINERS (GROUP) LTD., Guangdong (CN)

(72) Inventors: Lan Deng, Shenzhen (CN); Shaomin Chang, Shenzhen (CN); Wei Xiang, Shenzhen (CN); Yuefeng Yang, Shenzhen (CN); Haibin Wang, Shenzhen (CN); Haiqiu Liu, Shenzhen (CN)

(73) Assignees: Shenzhen CIMC-Tianda Airport Support Ltd., Guangdong (CN); China International Marine Containers (Group) Ltd., Guangdong (CN)

( * ) Notice: Subject to any disclaimer, the term of this patent is extended or adjusted under 35 U.S.C. 154(b) by 116 days.

(21) Appl. No.: 15/329,990

(22) PCT Filed: Jul. 2, 2015

(86) PCT No.: PCT/CN2015/083205
§ 371 (c)(1),
(2) Date: Jan. 27, 2017

(87) PCT Pub. No.: WO2016/015546
PCT Pub. Date: Feb. 4, 2016

(65) Prior Publication Data
US 2017/0262732 A1    Sep. 14, 2017

(30) Foreign Application Priority Data
Aug. 1, 2014  (CN) .......................... 2014 1 0377430

(51) Int. Cl.
*G06K 9/62*     (2006.01)
*G01S 17/06*    (2006.01)
(Continued)

(52) U.S. Cl.
CPC ............ *G06K 9/6202* (2013.01); *B64F 1/002* (2013.01); *G01S 17/06* (2013.01); *G01S 17/88* (2013.01);
(Continued)

(58) Field of Classification Search
CPC .. B64F 1/002; B64F 1/00; G01S 17/06; G01S 17/88; G06K 9/00791; G06K 9/6202;
(Continued)

(56) References Cited

U.S. PATENT DOCUMENTS 4,994,681 A    2/1991  Mann
5,166,746 A    11/1992 Sato et al.
(Continued)

FOREIGN PATENT DOCUMENTS

CN    1399767 A    2/2003
CN    1664877 A    9/2005
(Continued)

OTHER PUBLICATIONS

Application of Information Fusion technology in the Airport Automatic Docking System.
(Continued)

*Primary Examiner* — Mekonen T Bekele
(74) *Attorney, Agent, or Firm* — Amster, Rothstein & Ebenstein LLP

(57) ABSTRACT

A system and method for aircraft docking guidance and aircraft type identification. The method is executed in the system for aircraft docking guidance and aircraft type identification comprising a machine vision sub-system, a laser scanning sub-system and a fusion module. The method
(Continued)

includes: in step 1000, obtaining, by the machine vision sub-system, an image via image capturing means, and calculating a first aircraft front wheel position therefrom; in step 2000, obtaining, by the laser scanning sub-system, the position of the nose of an aircraft via laser scanning means, and calculating a second aircraft front wheel position; in step 3000, fusing the first aircraft front wheel position and the second aircraft front wheel position according to a fusion rule, to obtain deviation of an aircraft front wheel.

19 Claims, 19 Drawing Sheets

(51) Int. Cl.
| | | |
|---|---|---|
| *G01S 17/88* | (2006.01) | |
| *G08G 5/06* | (2006.01) | |
| *B64F 1/00* | (2006.01) | |
| *G06K 9/00* | (2006.01) | |
| G06K 9/20 | (2006.01) | |
| G06K 9/36 | (2006.01) | |
| G06K 9/60 | (2006.01) | |
| H04N 7/00 | (2011.01) | |

(52) U.S. Cl.
CPC .......... *G06K 9/00791* (2013.01); *G08G 5/06* (2013.01); *G08G 5/065* (2013.01); *B64F 1/00* (2013.01); *G06K 9/20* (2013.01); *G06K 9/36* (2013.01); *G06K 9/60* (2013.01); *H04N 7/00* (2013.01)

(58) Field of Classification Search
CPC .. G06K 9/20; G06K 9/36; G06K 9/60; G08G 5/06; G08G 5/065; H04N 7/00
See application file for complete search history.

(56) References Cited

U.S. PATENT DOCUMENTS

| | | | | |
|---|---|---|---|---|
| 5,675,661 | A * | 10/1997 | Richman | B64F 1/002 340/958 |
| 6,023,665 | A * | 2/2000 | Millgard | B64F 1/002 340/958 |
| 6,100,964 | A * | 8/2000 | De Cremiers | B64F 1/002 340/958 |
| 6,282,488 | B1 | 8/2001 | Castor et al. | |
| 6,353,793 | B1 * | 3/2002 | Godwin | G01M 1/125 701/120 |
| 2002/0099497 | A1 * | 7/2002 | Godwin | G01M 1/125 701/124 |
| 2003/0060998 | A1 * | 3/2003 | Millgard | B64F 1/305 702/127 |
| 2004/0059497 | A1 | 3/2004 | Sankrithi | |
| 2008/0229525 | A1 | 11/2008 | Hutton | |
| 2009/0150010 | A1 * | 6/2009 | Villaume | G05D 1/0083 701/3 |
| 2014/0136091 | A1 * | 5/2014 | Perrie | G08G 5/065 701/120 |
| 2015/0253773 | A1 * | 9/2015 | Cox | G05D 1/0083 701/3 |

FOREIGN PATENT DOCUMENTS

| | | |
|---|---|---|
| CN | 100541118 C | 9/2009 |
| CN | 101739694 A | 6/2010 |
| CN | 102252619 A | 11/2011 |
| CN | 102567093 A | 7/2012 |
| CN | 103049788 A | 4/2013 |
| CN | 103177586 A | 6/2013 |
| CN | 103853893 A | 6/2014 |
| DE | 4301637 A1 | 8/1994 |
| EP | 2109065 A2 | 10/2009 |
| ES | 2206016 A1 * | 5/2004 |
| WO | 02056054 A2 | 7/2002 |
| WO | 2013141605 A | 9/2013 |
| WO | WO 2013141605 A1 * | 9/2013 ............. G01S 17/06 |

OTHER PUBLICATIONS

Supplementary European Search Report of EP15827975 dated Feb. 9, 2018.

Guo, Yanying, "Research on Key Technologies in Visual-based Aircraft Docking Automatic Guided", China Doctoral Dissertations, Oct. 2012.

Chinese Notice of Allowance—Application No. 201410377430.5—dated May 24, 2018.

Li, G., et al. "Application of Fuzzy Federal Kalman Filtering in the Airport Automatic Docking Guidance" Journal of Chinese Computer Systems; vol. 29, No. 7, Jul. 7, 2008 (1320-1323 pp.).

Han, W., et al. "Development Status and Key Technical Analysis of Airport Docking Guide System" Laser & Infrared; vol. 42, No. 3, Mar. 2, 2012 (244-249 pp.).

* cited by examiner

SYSTEM AND METHOD FOR AIRCRAFT DOCKING GUIDANCE AND AIRCRAFT TYPE IDENTIFICATION

CROSS-REFERENCE TO RELATED APPLICATIONS

The present application is based upon and claims priority to Chinese Patent Application No. 201410377430.5, filed Aug. 1, 2014, the entire contents of which are incorporated herein by reference.

TECHNICAL FIELD

The present disclosure generally relates to a docking guidance system, and more particularly, to an aircraft docking guidance and aircraft type identification system and method.

BACKGROUND

Aircraft docking guidance refers to a process of guiding an arriving aircraft from an end of a taxiway to a parking position at an apron and guiding the aircraft to stop at a designated exact position. The aim of the docking guidance is to ensure safe and accurate docking of the arriving aircraft, to facilitate accurate cooperation of the aircraft with various ground interfaces (ground crews), and to make the passenger boarding bridge (PBB) accurately connected to the aircraft door and thereby improve the efficiency and safety of the airport.

Automated aircraft docking guidance systems may be divided into the following categories depending on the types of the employed sensors:

(1) buried loop coils category; (2) laser scanning and ranging category; (3) visual perception category.

The automated guidance systems of the laser scanning and ranging category and the visual perception category can obtain visual information about an aircraft being docked, the two categories of automated aircraft docking guidance systems can be called as visual docking guidance systems.

The automated guidance systems using buried loop coils detect whether there is a metal object passing or stopping to determine the position of an arriving aircraft. The systems using the buried loop coils have advantages such as fast response speed, low costs and no requirements on weather and illumination, but these systems are not accurate and have low anti-interference capability. Also, leads and electronic elements buried in the ground can be broken easily and have low reliability, and such elements have low measurement accuracy, cannot identify aircraft types, and are less debuggable and maintainable.

The automated docking guidance systems of the laser scanning and ranging category determine information such as positions, speeds and types of aircrafts by laser scanning and ranging, are less influenced by environment illumination and weather, have high accuracy and are debuggable and maintainable.

The automated docking guidance systems of the visual perception category obtain image information about the procedure of aircraft docking by optical imaging, and determine information such as positions, speeds and types of the aircrafts being docked based on intelligent information process technologies. These systems have advantages such as simple structure, low costs, high intelligent level, being debuggable and maintainable, but have shortcomings of high requirements on weather and illumination and poor adaptability.

With continuous development of visual perception technologies, intelligent information process technologies and computer technologies, visual aircraft docking guidance technologies(systems) can obtain docking information about aircrafts being docked accurately and fast, and have been widely applied in docking guidance systems of many airports.

Visual Docking Guidance System (VDGS) designed by Honeywell and Video Docking System (VDOCKS) designed by Siemens, as international leading level visual guidance devices, have been applied in various airport across the world.

However, these systems require specific weather and illumination conditions, have poor adaptability, are lack of intelligent information process capability, and are less accurate.

SUMMARY

The technical problem to be solved by the present disclosure is to realize aircraft docking guidance, and to accurately determine deviation of a front wheel of an aircraft while effectively guiding the aircraft to be docked.

In order to solve the above problem, an embodiment of the present disclosure provides an aircraft docking guidance and type identification method, performed by an aircraft docking guidance and type identification system which includes a machine vision subsystem, a laser scanning subsystem and a fusion module, wherein the method includes:

in step 1000, obtaining images, by the machine vision subsystem, through image capturing and obtaining a first position of a front wheel of an aircraft by calculation based on the images;

in step 2000, obtaining a position of an aircraft nose of the aircraft, by the laser scanning subsystem, by means of laser scanning, and obtaining a second position of the front wheel of the aircraft by calculation; and in step 3000, performing fusion with respect to the first position and the second position of the front wheel of the aircraft according to a fusion rule to identify deviation of the front wheel of the aircraft.

According to an embodiment, step 1000 further includes:

in step S1, performing an aircraft docking scene division step to divide a monitoring scene into different information process functional areas;

in step S2, performing an image preprocess step to perform preprocess on the captured images;

in step S3, performing an aircraft capture step to recognize engines and the front wheel of the aircraft from the images so as to conform that an aircraft appears in the images;

in step S4, performing an aircraft tracking step to continuously track the images of the engines and the front wheel of the aircraft captured in step S3 and update the images of the engines and the front wheel of the aircraft in real time;

in step S5, performing an aircraft locating step to locate the aircraft in real time and accurately determine a deviation degree of the aircraft with respect to a guidance line and how far the aircraft is from a stopping line.

According to an embodiment, the image preprocess step further includes:

in step S21, determining whether the images belong to a low illumination image, a high illumination image or a normal illumination image according to average gray levels of the images, performing a low illumination image process on low illumination images, and performing a high illumination image process on high illumination images;

in step S22, determining whether each of the normal illumination images is a normal image according to a variance of the image; and in step S23, for images which are not normal images, determining whether each of the images is an image of rain or snow or an image of fog, performing a rain-or-snow-image process step on the image of rain or snow, and performing a fog-image process step on the image of fog.

According to an embodiment, the low illumination image process includes:

$$g(x,y)=f(x,y)+af(x,y)(255-f(x,y))$$

wherein f(x,y) represents an original image, (x,y) are coordinates of individual pixel points in the image, g(x,y) represents the processed image, and a is a low illumination image process parameter.

According to an embodiment, the rain-or-snow-image process step includes:

finding pixels to be processed which are corrupted by rain or snow using a brightness measurement model;

for pixels to be processed in a current image, extracting brightness values of corresponding pixels in preceding and succeeding images which are adjacent to the current image, determining whether the corresponding pixels in the preceding and succeeding images which are adjacent to the current image are pixels to be processed according to the brightness values;

if the corresponding pixels in the preceding and succeeding images which are adjacent to the current image are pixels to be processed, obtaining an average value of brightness values of all pixels which are adjacent to the pixels to be processed in the current image, and replacing the brightness values of the pixels to be processed in the current image with the average value;

if the corresponding pixels in the preceding and succeeding images which are adjacent to the current image are not pixels to be processed, replacing the brightness values of the pixels to be processed in the current image with a minimum value among the brightness values of the corresponding pixels in the preceding and succeeding images which are adjacent to the current image or an average value of two minimum values among the brightness values of the corresponding pixels in the preceding and succeeding images which are adjacent to the current image.

According to an embodiment, the fog-image process step is performed by homomorphic filtering.

According to an embodiment, the aircraft capture step further includes:

in step S31, performing a background removal step to simulate a dynamic distribution of background of the filed using a single-Gaussian background model to establish a background model, and removing the background using a difference between current images and the background model to obtain a foreground area;

in step S32, performing a shadow removal step to calculate gray levels of the foreground area to identify a maximum gray level g max and a minimum gray level g min, and perform a shadow removal on an area which has a gray level smaller than T=g min+(g max−g min)*0.5;

in step S33, performing an area classification step, establishing a standard front aircraft area template, extracting a target area by change detection, calculating a vertical projection curve of the area, calculating a correlation coefficient between the vertical projection curve and a vertical projection curve of the standard front aircraft area template, and if the correlation coefficient is greater than or equals to a classification threshold, determining that the target area corresponds to an aircraft; and in step S34, performing a feature verification step to further verify whether the target area corresponds to the aircraft by detecting the engines and the front wheel of the captured aircraft.

According to an embodiment, the feature verification step further includes:

in step S341, performing an extremely black area extraction step to obtain a statistical gray level histogram for the target area of the current image, identify a maximum gray level and a minimum gray level within a gray level range of 1%~99%, and extract the most black portion of the image based on a preset extremely black judgment threshold, the maximum gray level and the minimum gray level to obtain an extremely black area;

in step S342, performing quasi-circle detection to extract all outer boundaries of the extremely black area, and for each of the boundaries, calculate barycentric coordinates of the boundary using moment of the boundary, wherein the ji-th moment of the boundary is defined as:

$$m_{ji} = \sum_{x,y} (f(x,y) \bullet x^j y^i)$$

wherein the barycentric coordinates $(\bar{x},\bar{y})$ are:

$$\bar{x} = \frac{m_{10}}{m_{00}}, \bar{y} = \frac{m_{01}}{m_{00}},$$

and for all pixel points in a current boundary, calculate distances between the pixel points and the barycenter; if a ratio between a calculated maximum distance and a calculated minimum distance is greater than a circle judgment threshold, determine that the area is not circular, and proceed to conduct determination of a next area; and if the ratio is not greater than the circle judgment threshold, determine that the area is quasi-circular, and record the barycentric coordinates and the radius of the area;

in step S343, detecting the engines of the aircraft in the quasi-circular area by similarity determination; and in step S344, detecting the front wheel of the aircraft to obtain the first position of the aircraft.

According to an embodiment, in step S343, for M detected quasi-circular areas, a similarity Similarity$_{ij}$ between a i-th quasi-circular area and a j-th quasi-circular area is:

$$Similarity_{ij}=|Height_i-Height_j|*|Radius_i-Radius_j|$$

wherein height represents a barycenter height, Radius represent a radius, and when the similarity Similarity$_{ij}$ is smaller than a preset similarity threshold, it is determined that the i-th quasi-circular area and the j-th quasi-circular area correspond to engines of the aircrafts.

According to an embodiment, in step S343, if no aircraft engine is detected, iterative detection is performed to perform steps S341 to S343 by increasing the extremely black judgment threshold, the circle judgment threshold, and the similarity threshold; if there still is no aircraft engine detected, a 7*7 circular template is applied on all the extremely black areas to perform an opening operation and then steps S342 to S343 are performed;

if there still is no aircraft engine detected, the iterative detection is performed for twice; and if there still is no aircraft engine detected, it is determined that there is no engine existing in the image.

According to an embodiment, the extremely black judgment threshold, the circle judgment threshold, and the similarity threshold are increased by 0.05, 0.5 and 20, respectively.

According to an embodiment, step S344 further includes:

in an searching area of the image, quantizing 256 gray levels into 64 gray levels, searching a first peak and a first valley in the quantized 64 gray level histogram, wherein a best peak position BestPeak and a best valley position BestValley in the original 256 gray level histogram are defined as:

$$BestPeak = \operatorname*{argmax}_{peak*4-4 \leq i \leq peak*4+3} \{hist_{256}(i)\}$$

$$BestValley = \operatorname*{argmin}_{BestPeak \leq i \leq valley*4+3} \{hist_{256}(i)\}$$

wherein hist256(i) is the total number of pixels having a gray level of i in the 256 gray level histogram;

dividing the gray levels using BestValley, and for portions which have a gray level smaller than the BestValley, removing desultory points having relatively a small area and performing a closing operation on the image using a flat ellipse-shaped structuring element; and for all graphics, calculating seven-order Hu moment features of boundaries, comparing the seven-order Hu moment features with moment features of a preset standard front wheel model, and if similarity is lower than a threshold, determining a middle graphic is the front wheel.

According to an embodiment, the aircraft tracking step further includes:

in step S41, after obtaining positions of engines in the last frame of image, performing tracking using a flood fill algorithm to determine an engine area in a current frame;

in step S42, if a fill result in step S41 is not valid, performing a dark environment detection and tracking step to conduct steps S341 and S342 using parameters for the last frame to detect and track the engine area;

in step S43, after obtaining information regarding the engine area, detecting the front wheel of the aircraft using step S344 to obtain the first position of the front wheel of the aircraft;

in step S44, performing a front wheel emergency process step: when detecting that a shape of the front wheel is not correct or that a position of the front wheel obviously deviates from that in previous frames of images, according to information of the last frame of image and the current frame of image, estimating displacement of the front wheel in the current frame based on displacement of the engines between two adjacent frames of images to obtain an estimation result as a front wheel tracking result; if no front wheel can be detected after more than N frames of images, outputting error information.

According to an embodiment, the aircraft locating step includes:

in step S51, performing a camera device calibration and image correction step to determine a correspondence between optical parameters of a camera device and a geographic coordinate system;

in step S52, performing an aircraft front wheel deviation degree calculation step; and in step S53, performing an aircraft front wheel actual distance calculation step.

According to an embodiment, step S51 further includes:

in step S511, reading N calibration pictures;

in step S512, finding chessboard corner points using a function cvFindChessboardCorners( ) in OpenCV, bringing the read N calibration pictures into the function cvFindChessboardCorners( ); if finding of all corner points is successful, returning 1 by the function, and obtaining coordinates of the corner points in an image coordinate system; if finding of all corner points is not successful, returning 0 by the function; and in step S513, bringing coordinates of the successfully found corner points on a calibration template into a function cvCalibrateCamera2( ), and returning a parameter matrix, a distortion coefficient, a rotational vector and translation vector of the camera device.

According to an embodiment, step S52 further includes:

according to the first position $(x_0, y_0)$ of the front wheel of the aircraft obtained in step S43, using a relationship between coordinates of the position and the guidance and stopping lines, obtaining a straight line equation of the guidance line as $y_1=k_1x_1+b_1$ and a straight line equation of the stopping line as $y_2=k_2x_2+b_2$, wherein a distance from the coordinates of the position to a straight line is:

$$d = \frac{kx - y + b}{\sqrt{k^2 + 1}};$$

and bringing $(x_0, y_0)$ into the two straight line equations to obtain $d_1$ and $d_2$; wherein if $d_2 \geq 0$, it is indicated that the front wheel of the aircraft runs beyond the stopping line; if $d_2 < 0$, it is indicated that the front wheel of the aircraft has not arrived at the stopping line; and at this time, if $k_1 > 0$, $d_1 > 0$ indicates that the aircraft deviates toward left and $d_1 < 0$ indicates that the aircraft deviates toward right; and if $k_1 < 0$, $d_1 < 0$ indicates that the aircraft deviates toward left, $d_1 > 0$ indicates that the aircraft deviates toward right.

According to an embodiment, step S52 further includes:

determining whether $|d_1| > width/2$, wherein width is a threshold equal to a width of the front wheel of the detected aircraft;

if $|d_1| > width/2$, determining that the aircraft deviates from the guidance line.

According to an embodiment, step S53 further includes:

establishing a correspondence between image coordinates and geodetic coordinates;

obtaining image coordinates of calibration points used during the filed setting in step S1, conducting quadratic curve fitting using the image coordinates by a least square method to obtain a curve line equation $y=ax^2+bx+c$, wherein x is a distance on an image, y is an actual distance;

projecting the position of the front wheel of the aircraft on the image onto the guidance line along a direction of the stopping line, calculating an Euclidean distance between a projection point and a stopping point as x, and obtaining an actual distance from the front wheel of the aircraft to the stopping line using $y=ax^2+bx+c$.

According to an embodiment, the method further includes step S7 performed after step S3, wherein step S7 is an aircraft identification and identity verification step which includes:

in step S71, performing parameter verification: extracting aircraft parameters in the images, and comparing the aircraft parameters with type data which is pre-stored in a database to obtain a type similarity parameter;

in step S72, performing template matching: comparing the images with type templates which are pre-stored in the database to obtain a template similarity parameter; and in step S73, performing a synthetic judgment: when the type similarity parameter and the template similarity are greater than or equal to a verification threshold, determining that identity verification is passed.

According to an embodiment, step S71 further includes:

in step S711, extracting an aircraft engine parameter in the images, and comparing the aircraft engine parameter with an aircraft engine parameter of a corresponding type which is pre-stored in the database to obtain a first ratio;

in step S712, extracting an aircraft wing parameter in the images, and comparing the aircraft wining parameter with an aircraft wing parameter of the corresponding type which is pre-stored in the database to obtain a second ratio;

in step S713, extracting an aircraft head parameter in the images, and comparing the aircraft head parameter with and aircraft head parameter of the corresponding type which is pre-stored in the database to obtain a third ratio;

in step S714, extracting an aircraft tail fin parameter in the images, and comparing the aircraft tail fin parameter with an aircraft tail fin parameter of the corresponding type which is pre-stored in the database to obtain a fourth ratio; and in step S715, identifying the maximum one and the minimum one among the first ratio, the second ratio, the third ratio and the fourth ratio, and calculating a ratio of the minimum one to the maximum one as the type similarity parameter.

According to an embodiment, step S72 further includes:

in step S721, performing global template matching: with a whole image as an image to be searched and a standard aircraft image as a template, calculating a global template similarity parameter; and in step S722, performing a local template matching: with images of an aircraft engine, an aircraft wing, an aircraft head and an aircraft tail fin extracted according to steps S711 to S714 as images to be searched, and an aircraft engine, an aircraft wing, an aircraft head and an aircraft tail fin in the standard aircraft image as templates, calculating four similarities between the images to be searched and the templates, removing the minimum one among the four similarities and calculating an average value of the remaining three similarities as a local template similarity parameter.

According to an embodiment, step S73 further includes:

if at least two of the type similarity parameter, the global template similarity parameter and the local template similarity parameter are greater than or equal to a first verification threshold, determining that the identity verification is passed; or if all of the type similarity parameter, the global template similarity parameter and the local template similarity parameter are greater than a second verification threshold, determining that the identity verification is passed.

According to an embodiment, step 2000 further includes:

in a capture step, conducting laser scanning to horizontally scan a position where an aircraft head of an aircraft is expected to appear, obtaining pieces of echo data based on the laser scanning, and according to a judgment condition, determining whether the aircraft appears based on the echo data;

in a guidance step, after the aircraft appears, conducting the laser scanning to horizontally scan the aircraft head, obtaining the echo data based on the laser scanning, and determining a position of an aircraft nose of the aircraft according to the echo data; and in a tracking step, while the aircraft is traveling, tracking the position of the aircraft nose by adjusting a vertical scanning angle of the laser scanning.

According to an embodiment, prior to the capture step, the method further includes a zero point calibration step which includes a device mounting zero point calibration step performed when the laser scanning system is first installed, wherein the device mounting zero point calibration step includes:

a horizontal zero point measurement step which includes:

horizontally scanning, by the scanning system, a calibration area on the ground with a vertical scanning angle fixed, wherein the calibration area is divided equally into N small regions; measuring distances from a boundary point of each of the small regions, and finding a minimum value among the obtained distance values; determining an extended area with a boundary point corresponding to the minimum value as a center; and identifying a point corresponding to a minimum distance value as a horizontal zero point; and a vertical zero point measurement step which includes:

conducting distance measurement at a vertical scanning angle $\beta_1$ by the scanning system to obtain a first distance value $L_1$, conducting the distance measurement again by adjusting the vertical scanning angle $\beta_1$ by an angle $\lambda$ to obtain a second distance value $L_2$, and calculating $\beta_1$ using the following equation:

$$L_1 * \sin \beta_1 = L_2 * \sin(\beta_1 - \lambda)$$

wherein a straight line where $L_1$ is located is taken as a hypotenuse, a projection line of the hypotenuse on the ground is taken as a leg, and a vertex of a right-angled triangle formed by the hypotenuse and the leg, an included angle between which is $\beta_1$, is taken as a vertical zero point.

According to an embodiment, the zero point calibration step further includes a zero point correction step which includes:

after the device mounting zero point calibration step is finished, adjusting a scanning angle of the scanning system from a zero point step by step until a preset reference object is found, and recording a scanning angle at this time as a correction angle; and when the scanning system is restarted, adjusting the scanning angle backwards by the correction angle to find the zero point after the preset reference object is found by the scanning system.

According to an embodiment, the judgment condition further includes:

A: determining whether a ratio of the number of points of interest, which are continuous and one of which corresponds to a minimum distance value, to the total number of the pieces of echo data is greater than a threshold;

B: calculating an aircraft width based on the total number of the echo data, and determining whether the aircraft width is not less than a width threshold; and C: calculating an aircraft height and determining whether the calculated aircraft height is within a predetermined range;

wherein the distance values of the points of interest are within a specified range at two sides of a prediction length.

According to an embodiment, in the capture step, when the echo data is obtained, median filtering is performed on the echo data and then whether the aircraft appears is determined.

According to an embodiment, the guidance step further includes:

extracting from the echo data target points falling on the aircraft head, and converting the target points from polar coordinate data into three-dimensional spatial data;

identifying from the target points a point having a minimum Y-direction value as a closest point;

conducting curve fitting to fit the target points to a curve and identify a vertex of the curve; and determining one of the closest point and the vertex as the position of the aircraft nose according to a difference between an X-value of the closest point and an X-value of the vertex.

According to an embodiment, the tracking step further includes:

scanning the position of the aircraft nose at a predetermined vertical scanning angle while the aircraft is travelling;

calculating a current aircraft nose point according to the echo data; and vertically scanning the current aircraft nose point, and calculating a variation amount of the vertical scanning angle according to a vertex of a obtained parabola according to the scanning, and changing the vertical scanning angle according to the variation amount, or calculating the variation amount of the vertical scanning angle according to the current aircraft nose point and changing the vertical scanning angle according to the variation amount.

According to an embodiment, the method further includes an aircraft type identification step;

wherein the aircraft type identification step includes one or more of aircraft nose height verification, aircraft cabin width verification, verification of a head aerial view profile, verification of a head side view profile and aircraft engine verification;

the aircraft nose height verification includes: if a difference between the aircraft nose height and a preset aircraft nose height is within a preset range, determining that the aircraft nose height verification is passed;

the aircraft cabin width verification includes: finding two points from the echo data, a difference between X coordinates of which is the maximum, with a straight line distance between the two points as an aircraft cabin width, if the aircraft cabin width is greater than a product of a theoretic aircraft cabin width and a width coefficient, determining that the aircraft cabin width verification is passed;

the verification of the head aerial view profile includes: bringing the echo data $(x_i, y_i, z_i)$ obtained by horizontal laser scanning into a preset aerial view profile equation $y=f^n(x)$, calculating a horizontal fit point error $\Delta d_i^h = |f^n(x_i) - y_i|$, identifying a maximum horizontal fit error $D_H = \max(\Delta d_i^h)$, and if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation;

the verification of the head side view profile includes: bringing the echo data $(x_i, y_i, z_i)$ obtained by vertical laser scanning into a preset side view profile equation $z=g^m(y)$, calculating a vertical fit point error $\Delta d_j^v = |g^m(y_i) - z_i|$, identifying a maximum vertical fit error $D_v = \max(\Delta d_j^v)$, and if $D_V < \Delta D_V$, determining that the verification of the head side view profile is passed, wherein $\Delta D_V$ is a threshold for the verification of the head side view profile, i is the serial number of individual one of target points in the echo data, and m is the number of fittings of the side view profile equation;

the aircraft engine verification includes:

calculating positions of engines according to the position of the aircraft nose, and conducting laser scanning to horizontally and vertically scan the positions of the engines;

converting the echo data obtained by the horizontal scanning into x-y-z three dimensional coordinates, finding a closest coordinate point which is closest to a theoretic engine center, and finding points contiguous to the closest coordinate point to obtain a point set, and calculating a distance between a leftmost point and a rightmost point in the point set as an engine width and a middle point between the leftmost point and the rightmost point as a horizontal coordinate of an engine center;

converting the echo data obtained by the vertical scanning into x-y-z three dimensional coordinates, finding a closest coordinate point which is closest to the theoretic engine center, and finding points contiguous to the closest coordinate point to obtain a point set, and calculating a distance between a uppermost point and a lowermost point in the point set as an engine height, and a middle point between the uppermost point and the lowermost point as a height of the engine center from ground;

determining whether the number of the engines is consistent with a preset number, and if the number of the engines is not consistent with the preset number, determining that the aircraft engine verification is not passed;

determining whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determining that the aircraft engine verification is not passed;

determining whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determining that the aircraft engine verification is not passed.

According to an embodiment, the fusion rule includes:

for a case where the front wheel of the aircraft deviates from the guidance line:

determining whether a distance between x coordinates of the first position and the second position of the front wheel of the aircraft is smaller than or equal to a threshold; if the distance is smaller than or equal to the threshold, obtaining the deviation degree of the front wheel of the aircraft calculated by the machine vision subsystem; if the distance is greater than or equal to the threshold, performing smooth filtering on the first position and the second position of the front wheel of the aircraft to provide deviation information which indicates how the front wheel of the aircraft deviates from the guidance line;

for a case where there is a distance remaining from the front wheel of the aircraft to the stopping line:

determining whether there is an abnormal fluctuation in the second position of the front wheel of the aircraft; if there is not such abnormal fluctuation, obtaining the second position of the front wheel of the aircraft as the distance from the front wheel of the aircraft to the stopping line; if there is such abnormal fluctuation, obtaining an average difference value of N previous difference values between positions of the front wheel of the aircraft obtained by the machine vision subsystem and the laser scanning subsystem, and calculating a total of a position of the front wheel of the aircraft obtained by the machine vision subsystem this time and the average value as the distance from the front wheel of the aircraft to the stopping line.

According to an embodiment, the fusion rule further includes:

establishing a not-empty frame of discernment D={Ø,h, $\bar{h}$,H} using a fusion method based on D-S theory, wherein h represents that the aircraft type is right, $\bar{h}$ represents that the aircraft type is wrong, H={h, $\bar{h}$} represents that the aircraft type might be right or wrong and cannot be determined temporarily, and Ø represents an impossible event;

establishing a mass function $m_1(\bullet)$ of the machine vision subsystem and a mass function $m_2(\bullet)$ of the laser scanning subsystem, and the following condition is met:

$m_1(\emptyset)=0$, $m_2(\emptyset)=0$, $\Sigma m_1(\bullet)=1$, $\Sigma m_2(\bullet)=1$, wherein $$m_1(h) = \prod_{i=1}^{3}$$

coefficient i, $$m_1(\bar{h}) = \prod_{i=1}^{3} (1 - \text{coefficient } i),$$

$m_2(h)$ and $m_2(\bar{h})$ change according to a priority determination sequence preset by the laser scanning subsystem;

calculating an orthogonal sum of the mass functions:

$$m(h) = \frac{\sum_{x \cap y = h} m_1(x) m_2(y)}{1 - K},$$

wherein $$K = \sum_{x \cap y = \emptyset} m_1(x) m_2(y);$$

if:

$$\begin{cases} m(h) - m(\bar{h}) > \varepsilon_1 \\ m(H) < \varepsilon_2 \\ m(h) > m(H) \end{cases},$$

wherein $\varepsilon_1$ and $\varepsilon_2$ are preset thresholds, generating a fusion result which indicates that the aircraft type is right and the identity verification is passed;

if:

$$\begin{cases} m(\bar{h}) - m(h) > \varepsilon_1 \\ m(H) < \varepsilon_2 \\ m(\bar{h}) > m(H) \end{cases},$$

generating a fusion result which indicates that the aircraft type is wrong and the identity verification is not passed.

An embodiment of the present disclosure further provides an aircraft docking guidance and type identification device, including:

a machine vision device configured to obtain images, by a machine vision subsystem, through image capturing and obtain a first position of a front wheel of an aircraft by calculation based on the images;

a laser scanning device configured to obtain a position of an aircraft nose of the aircraft, by a laser scanning subsystem, by means of laser scanning, and obtain a second position of the front wheel of the aircraft by calculation; and a fusion device configured to perform fusion with respect to the first position and the second position of the front wheel of the aircraft according to a fusion rule to identify deviation of the front wheel of the aircraft.

According to an embodiment, the machine vision device further includes:

an aircraft docking scene setting unit configured to divide a monitoring scene into different information process functional areas;

an image preprocess unit configured to perform preprocess on the captured images;

an aircraft capture unit configured to recognize engines and the front wheel of the aircraft from the images so as to conform that an aircraft appears in the images;

an aircraft tracking unit configured to continuously track the captured images of the engines and the front wheel of the aircraft and update the images of the engines and the front wheel of the aircraft in real time; and an aircraft locating unit configured to locate the aircraft in real time and accurately determine a deviation degree of the aircraft with respect to a guidance line and how far the aircraft is from a stopping line.

According to an embodiment, the laser scanning device further includes:

a capture unit configured to conduct laser scanning to horizontally scan a position where an aircraft head of an aircraft is expected to appear, obtain echo data based on the laser scanning, and according to a judgment condition, determine whether the aircraft appears based on the echo data;

a guidance unit configured to, after the aircraft appears, conduct the laser scanning to horizontally scan the aircraft head, obtain echo data based on the laser scanning, and determine a position of an aircraft nose of the aircraft according to the echo data; and a tracking unit configured to, while the aircraft is traveling, track the position of the aircraft nose by adjusting a vertical scanning angle of the laser scanning, and display the position of the aircraft nose in real time.

The aircraft docking guidance and docking systems and methods provided by the present disclosure have effective intelligent information process capability, can capture, track and locate aircrafts, identify aircraft types and verify identities of aircrafts during aircraft docking. Also, the methods and systems have visual monitoring functions which can be applied in intelligent aprons, and can effectively improve automation, intelligence and operation management levels of civil aviation airports.

DETAILED DESCRIPTION

Structures and operating principles of the present disclosure will be described below with reference to drawings.

Figure 1:
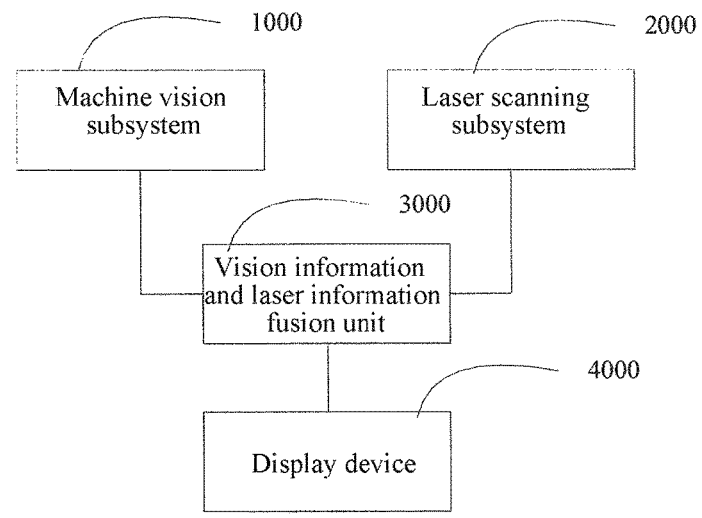
FIG. 1 is a block diagram illustratively showing a structure of an aircraft docking guidance and type identification system according to an embodiment of the present disclosure.

The present disclosure relates to an aircraft docking guidance and type identification system. FIG. 1 is a block diagram illustratively showing a structure of an aircraft docking guidance and type identification system according to an embodiment of the present disclosure.

The aircraft docking guidance and type identification system mainly includes a machine vision subsystem 1000, a laser scanning subsystem 2000, a vision information and laser information fusion unit 3000 and a display device 4000. The machine vision subsystem 1000, the laser scanning subsystem 2000 and the display device 4000 are connected to the vision information and laser information fusion unit 3000. The machine vision subsystem 1000 and the laser scanning subsystem 2000 correspond to the same aircraft dock, and obtain docking information of aircrafts, and send the obtained information to the vision information and laser information fusion unit 3000 which fuses the information into one set of information and sends the set of information to the display device 4000 for display.

Figure 2A:
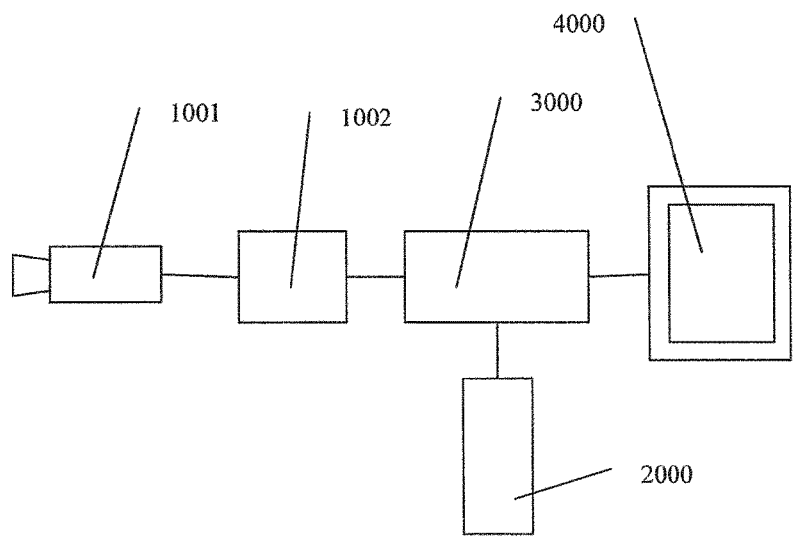
FIGS. 2A and 2B are block diagrams illustratively showing a structure of a machine vision subsystem according to an embodiment of the present disclosure.
Figure 2B:
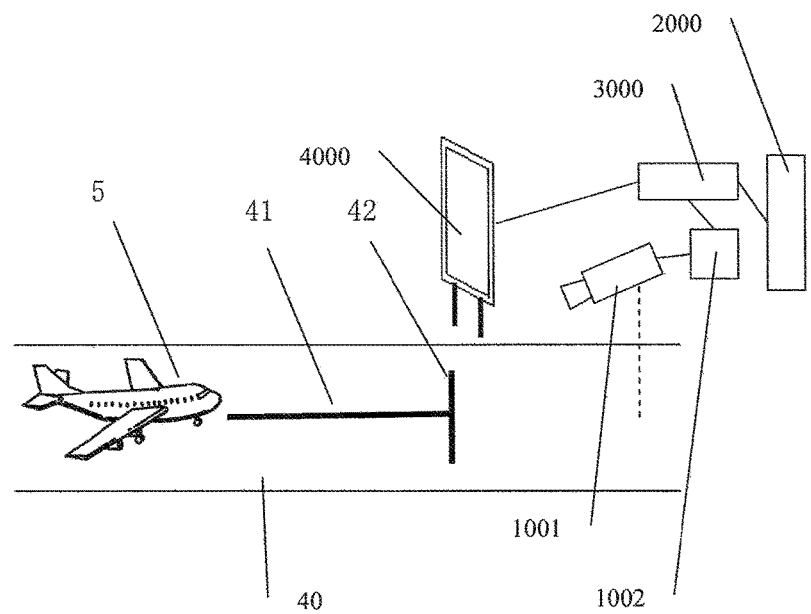

FIGS. 2A and 2B are block diagrams illustratively showing a structure of a machine vision subsystem according to an embodiment of the present disclosure. The machine vision subsystem 1000 mainly includes a camera device 1001 and a central process device 1002. The camera device 1001 is connected to the central process device 1002 which sends the processed information to the information fusion module 3000.

The camera device 1001 is disposed behind a stopping line 42 of an aircraft docking apron 40, preferably, directly facing a guidance line 41. The camera device 1001 may be mounted at a height above the body of an aircraft 5, for example, 5 to 8 meters above the aircraft body. The camera device 1001 sends captured images to the central process device 1002.

The central process device 1002 may be a computing device which is capable of receiving, processing and storing data, generating image data to be displayed, and sending data. For example, the central process device 1002 may include a plurality of functional modules which are configured to configure the aircraft docking scene, preprocess videos and images, capture aircrafts, track aircrafts, locate aircrafts, identify aircraft types and verify identities, and all of the functional modules can be implemented as software installed in the central process device 1002. The display device 4000 may be a large information display screen which is mounted at an airport for pilots to view, for example. Further, airport crew may be provided with hand-held display devices to view conditions of aircrafts.

Figure 3:
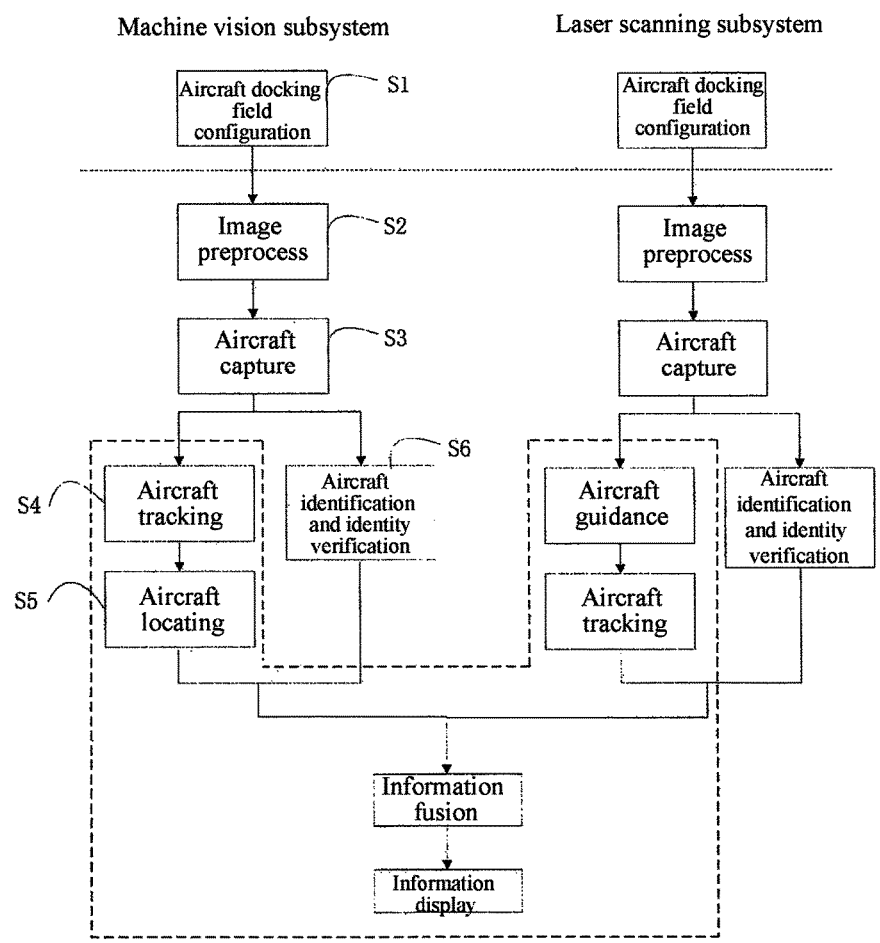
FIG. 3 is a flowchart illustratively showing an aircraft docking guidance and type identification method according to an embodiment of the present disclosure.

FIG. 3 is a flow chart illustratively showing an aircraft docking guidance and type identification method according to an embodiment of the present disclosure. Referring to FIG. 3, the machine vision-based aircraft docking guidance and type identification method provided by the present disclosure may include the following steps.

The operating details of the machine vision subsystem 1000 will be described below.

In step S1, aircraft docking scene is set.

The aircraft docking scene setting refers to dividing a monitoring scene into different information process functional areas, and determining specific positions and states of some important reference objects in the scene. The aircraft docking scene setting is the basis for effectively processing aircraft docking information.

An aircraft may go through a long distance from entering into an apron to finally stopping, and thus the procedure of aircraft docking guidance can be divided into a plurality of phases, and different contents need to be monitored during different phases. That is to say, the scene for aircraft docking needs to be set in advance.

In step S1, the monitoring scene of the aircraft docking apron 40 is divided into different functional areas for different information process to reduce the process range of pictures and thereby increase process efficiency.

In addition to the different functional areas, two of the most important markings in the aircraft docking scene are the guidance line and the stopping line. Effective identifying of the positions of the guidance line and the stopping line is an important basis and an essential part for ensuring successful aircraft docking, and is also a key factor for distinguishing the functional areas. Individual functional areas are marked in the present disclosure to perform corresponding guidance information process tasks at these functional areas. Further, relevant ground device areas are marked to avoid accidents during aircraft docking.

In this step, defining of the monitoring scene of the aircraft docking apron 40 can be performed first. A ruler on which alternating black and white stripes are arranged is laid immediately adjacent to the guidance line 41, the interval between the black stripes and the interval between the white stripes may be the same, and the maximum interval may be 1 m, for example. Depending on the resolution of the camera device, finer rulers with an interval of 0.5 meter, or 0.25 meter may be used. The total length of the ruler may be not beyond the range within which distance and position calculation with respect to aircrafts are performed, for example, the length is usually 50 meters.

By software running on the central process device 1002, the monitoring scene can be reconstructed. After opening the software, images captured by the camera device 1001 with respect to the aircraft docking apron 40 can be displayed, and relevant areas can be marked by drawing lines, selection boxes or points manually, and records can be stored.

Figure 4:
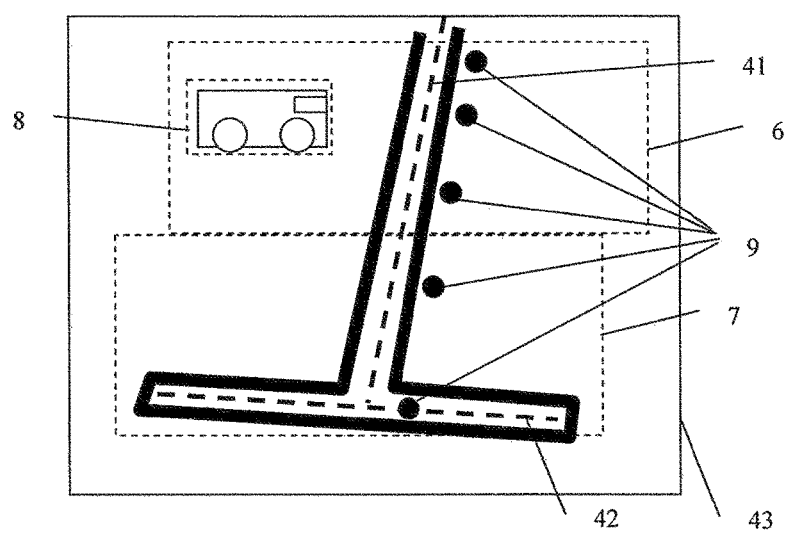
FIG. 4 is a schematic diagram illustratively showing an aircraft docking filed according to an embodiment of the present disclosure.

The camera device 100 captures scene images of the aircraft docking apron 40 when no aircraft is docked, and sends the images to the central process device 1002. The aircraft docking scene setting is shown in FIG. 4. In this figure, the frame 43 represents an image displayed when a calibration operation is performed and an area which can be drawn, the dotted line frames in this figure indicate positions where manual drawing can be conducted. Lines can be drawn manually on the displayed images, for example, the guidance line 41 and the stopping line 42 can be marked. Then, information about positions of the guidance line 41 and the stopping line 42 on the image are saved and recorded. By drawing selection boxes manually, a capture area 6, a tracking and location area 7, and a relevant ground device area 8 are marked. Information about positions of the capture area 6 and the tracking and location area 7 on the image are saved and recorded. A type identification and identity verification area and the tracking and location area 7 can correspond to the same area. Then, according to the ruler laid in the filed, points can be drawn manually to mark all the marking points 9 which are immediately adjacent to the guidance line 41 and spaced from each other by 1 meter. Information about the positions of these points on the image, and the distances of individual points 9 from the first marking point 91 in the actual scene are saved and recorded.

When marking the guidance line 41, the stopping line 42 and the marking points 9, image portions which need to be marked can be enlarged, for example, up to a width of tens of pixels, and manual marking can be conducted in middle portions to increase marking accuracy. No strict requirements are imposed on the marked positions of the capture area 6 and the tracking and location area 7. The upper edge of the capture area 6 is about 100 meters away from the stopping line 42 in actual scene, the lower edge of the capture area 6 is about 50 meters away from the stopping line in actual scene, the upper edge of the tracking and location area 7 is about 50 meters away from the stopping line in actual scene, and the lower edge of the tracking and location area 7 is required to be below the stopping line.

In FIG. 3, step S1, which is above the dotted line, is performed after installation of the system but before the docking guidance. The steps below the dotted line are performed during the docking guidance. The steps within the dotted line frame are performed and updated in real time during the docking guidance.

Step S2 is an image preprocess step, which is performed after step S2. This step is performed to improve visual effects of images, and increase resolution of image elements or make images suitable for being processed by computers. Aircraft docking may be performed under various weather conditions, for example, day and nights, cloudy, rainy, snowy or fogy days, and the like, and images captured under these conditions may be different. Specifically, some images may have relatively low illumination, while some images may have over high illumination. In order to facilitate subsequent image processes, the collected images may be processed in advance to obtain more ideal images. The images collected under different conditions may be classified into the following four categories depending on illumination: lower illumination images, high illumination images, normal illumination images and images of cloudy, rainy or snowy weather. The four categories of image can be processed differently.

Figure 5A:
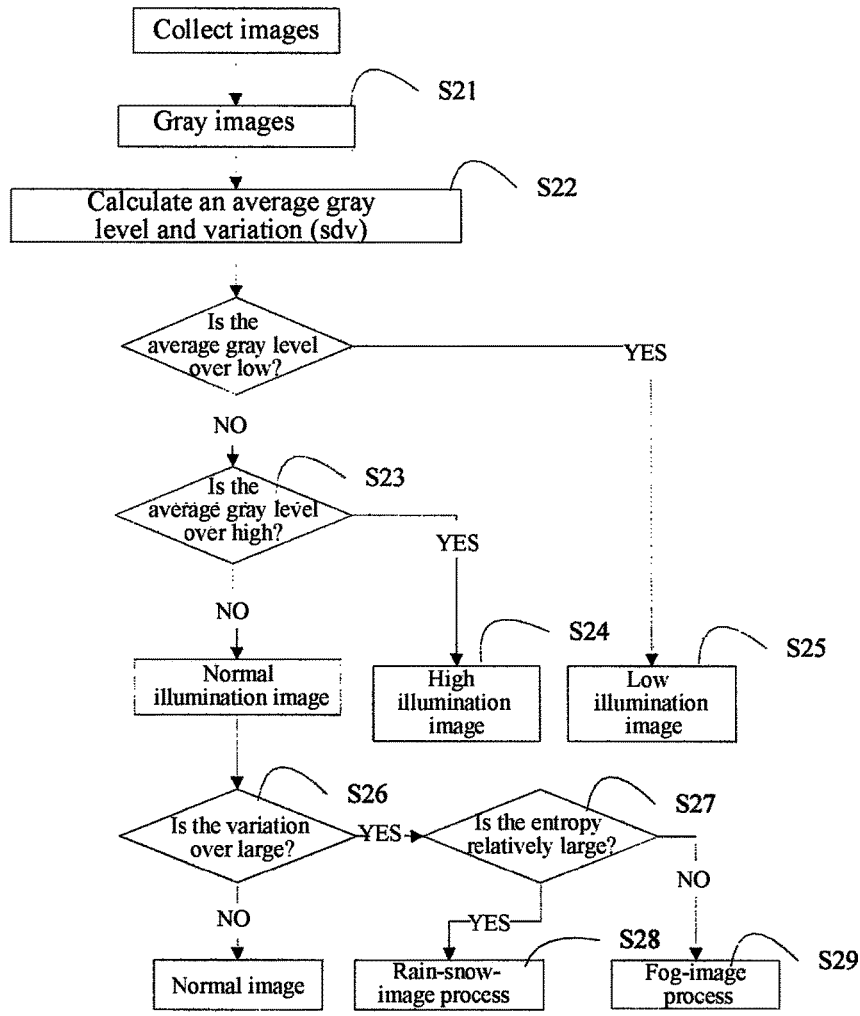
FIGS. 5A and 5B are flow charts illustratively showing an image preprocess step.
Figure 5B:
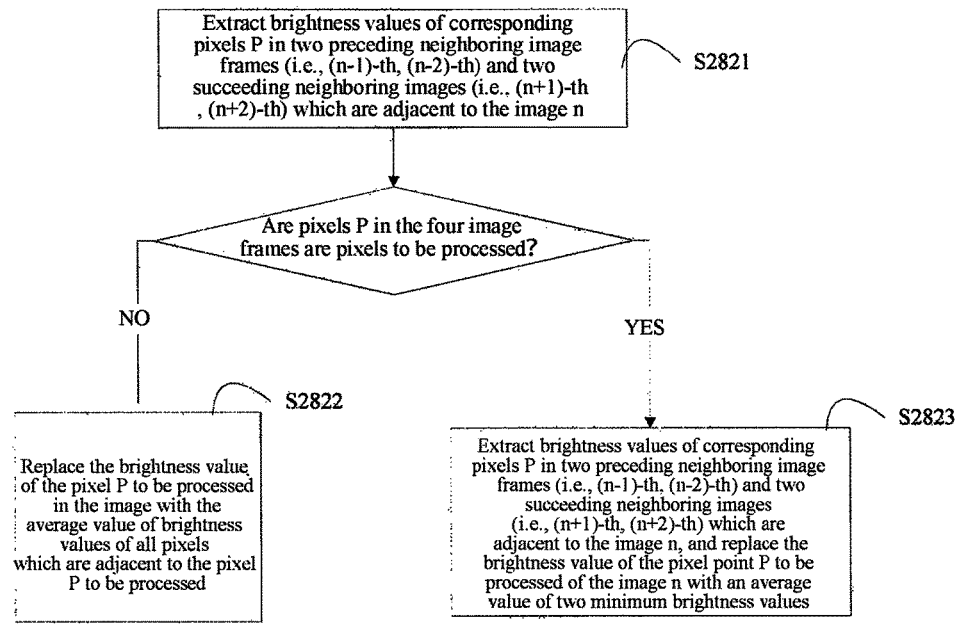

FIGS. 5A and 5B are flow charts illustratively showing details of the image preprocess step.

The camera device 1001 takes photos at the capture area 6 in real time. For each of the captured image, step S2 and subsequent steps after step S2 are performed.

Step S2 further includes the following steps:

In step S21, graying is performed on a captured image.

In step S22, an average gray level and variance of the image are calculated, and whether the average gray level is lower than a lowest threshold is determined. If the average gray level is lower than the lowest threshold, the image is determined as a low illumination image, and a low illumination image process step in step S25 is performed; and if the average gray level is not lower than the lowest threshold, step S23 is performed.

The lowest threshold may be a preset threshold, for example, a numerical value between 50 and 60.

In step S23, whether the average gray level of the image is higher than a highest threshold is determined. If the average gray level of the image is higher than the highest threshold, the image is determined as a high illumination image and a high illumination image process step in step S24 is performed; and if the average gray level of the image is not higher than the highest threshold, the image is determined as a normal illumination image, and step S26 is performed.

The highest threshold may be preset, for example, a numerical value between 150 and 160. Images having an average gray level between the highest threshold and the lowest threshold can be determined as normal illumination images.

In step S24, a high illumination image process is performed.

In step S24, gamma transformation is used to process the high illumination image to decrease the brightness of the image.

In step S25, a low illumination image process is performed.

The present disclosure uses non-linear transformation to process low illumination images. The transformation equation may be:

$$g(x,y)=f(x,y)+af(x,y)(255-f(x,y))$$

wherein f(x,y) represents an original image, (x,y) are coordinates of individual pixel points in the image, g (x,y) represents the processed image, and a is a low illumination image process parameter, which may be 0.01, for example.

In step S26, for a normal illumination image, whether variance of the image is greater than a standard variation value is determined. If the variance of the image is greater than the standard variation value, the image is determined as an image of rain, snow or fog, and step S27 is performed; and if the variance of the image is not greater than the standard variation value, it can be determined that the normal illumination image is not an image of rain, snow or fog and is a normal image, and no process is applied on this image.

In step S27, whether entropy of the normal illumination image is greater than a threshold. If the entropy of the normal illumination image is greater than the threshold, the normal illumination image is determined as an image of rain or snow, and a rain-or-snow-image process step in step S28 is performed; and if the entropy of the normal illumination image is not greater than the threshold, the normal illumination image is determined as an image of fog, and a fog-image process step in step S29 is performed.

Entropy is a mathematical quantity, which is used to describe the amount of information. For an image, the entropy represents the amount of details of an image, i.e., the amount of information contained in the image. For an image of rain or snow, due to the existence of rain or snow, raindrops or snowflakes may appear at different positions on the image so that the image may contain a relatively large number of details. For an image of fog, due to the even distribution of fog, a relatively small number of details are contained. Thus, entropy can be used to determine whether an image is an image of rain or snow or an image of fog.

In an embodiment, for a gray level image, an average neighborhood gray level of the image is selected as a space feature vector of gray level distribution, and the average neighborhood gray level and a pixel gray level of the image form a feature tuple denoted as (i, j), where i represents the gray level of a pixel ($0<=i<=255$), j represents the average neighborhood gray level ($0<=j<=255$); with f(i, j) as the frequency with which the feature tuple appears, N represents the size of the image, $p_{ij}=f(i,j)/N^2$, and two dimensional entropy of the gray level image can be calculated based on the following equation:

$$H = \sum_{i=0}^{256} p_{ij} \log p_{ij}.$$

In step S28, a rain-or-snow-image process step is performed.

The rain-or-snow-image process step uses a photometric model of pixels in the image sequence to determine linear correlations of brightness so as to eliminate the influence on the image caused by rain or snow.

A captured image influenced by rain or snow has the following photometric model.

In a case that the current weather is rain or snow weather and the background keeps unchanged, the brightness values $I_{n-1}$, $I_n$ and $I_{n+1}$ of the same pixel point P in three frames of images (i.e., (n−1)-th, n-th, (n+1)-th) captured for the same position meet the following condition:

the brightness value $I_{n-1}$ of the (n−1)-th frame is equal to the brightness value $I_{n+1}$ of the (n+1)-th frame, and the brightness variation value ΔI of the n-th frame resulted from rain or snow meets the following condition:

$$\Delta I = I_n - I_{n-1} = I_n - I_{n+1} \geq c$$

wherein c represents a smallest threshold of the brightness variation resulted from rain or snow.

Thus, in step S28, the following steps are further included.

In step S281, pixels to be processed which are corrupted by rain or snow are found using a photometric model.

That is, for a pixel point P in a current image n, whether $I_{n-1}$ is equal to $I_{n+1}$ and whether Δi is greater than or equal to c are determined. If the two determination results are yes, it can be determined that the pixel point P in the current image n is a pixel to be processed. The above determinations can be performed with respect to all the pixels in the image n until all the pixels to be processed are found.

In step S282, brightness adjustment is performed for the pixels to be processed.

Step S282 may further include the following steps.

In step S2821, for the pixel P to be processed in the image n, brightness values of corresponding pixels P in two preceding neighboring image frames (i.e., (n−1)-th, (n−2)-th) and two succeeding neighboring images (i.e., (n+1)-th, (n+2)-th) which are adjacent to the image n are extracted, and whether the pixels P in the four image frames are pixels to be processed is determined; if the pixels P in the four image frames are pixels to be processed, step S2822 is performed; and if not all the pixels P in the four image frames are pixels to be processed, step S2823 is performed.

In step S2822, an average value of brightness values of all pixels adjacent to the pixel P is obtained, the brightness value of the pixel P to be processed in the image is replaced with the average value, so that the influence on the brightness of the image caused by rain or snow can be eliminated.

In step S2823, for the pixel P to be processed in the image n, brightness values of corresponding pixels P in two preceding neighboring image frames (i.e., (n−1)-th, (n−2)-th) and two succeeding neighboring images (i.e., (n+1)-th, (n+2)-th) which are adjacent to the image n are extracted, that is, the brightness values of the same pixel point in a total of four image frames are extracted, and the two minimum brightness values are identified, an average value of the identified two brightness values is calculated, and the brightness value of the pixel P to be processed in the image n is replaced with the average value, so that the influence on the brightness of the image caused by rain or snow can be eliminated. In another embodiment, the brightness value of the pixel P to be processed in the image n can be replaced directly with the minimum one among the brightness values of the same pixel point in the four image frames.

In steps S2821 and S2823, the brightness values of corresponding pixel in one or three or more succeeding and preceding neighboring image frames of the image n can also be extracted.

In step S29, a fog-image process is performed.

In the fog-image process in step S29, homomorphic filtering may be used to eliminate the influence on the brightness of the image caused by fog.

Specifically, an image f(x,y) can be represented as a product of two parts, i.e., an illumination part and a reflection part:

$$f(x,y)=i(x,y)r(x,y)$$

wherein $0 \leq i(x,y) \leq +\infty$ is the illumination component, and $0 \leq r(x,y) \leq 1$ is the reflection component. By taking natural logarithm of both sides, the following formula can be obtained:

$$\ln f(x,y) = \ln i(x,y) + \ln r(x,y)$$

Then, after Fourier transform, the following formula can be obtained:

$$F(u,v)=I(u,v)+R(u,v).$$

A homomorphic filter function H(u,v) is used to process F(u,v):

$$S(u,v)=H(u,v)F(u,v)=H(u,v)I(u,v)+H(u,v)R(u,v)$$

The curve shape of H(u,v) can be approximated using a basic form of any kind of ideal highpass filter. For example, the following form which is obtained by slightly adjusting a Gaussian highpass filter can be used:

$$H(u,v)=(\gamma_H-\gamma_L)[1-e^{-(c(D^2(u,v)/D_0^2)}]+\gamma_L.$$

Figure 6:
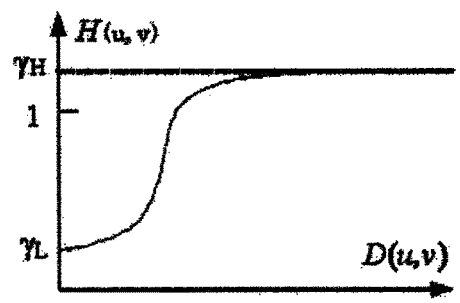
FIG. 6 shows an example of a curve of a homomorphic filter function.

FIG. 6 shows an example of the curve of a homomorphic filter function.

After inverse Fourier transform:

$$s(x,y)=F^{-1}[H(u,v)I(u,v)]+F^{-1}[H(u,v)R(u,v)],$$

and then by performing exponent arithmetic, the following process result can be obtained:

$$g(x,y)=\exp(s(x,y)),$$

wherein g(x,y) represents the result obtained after the fog-image process step.

For each image, after the preprocess step in step S3, relatively high image quality can be obtained, and then subsequent processes can be performed.

Step S3, which is an aircraft capture step, is performed after step S2.

The aircraft capture step is very important, because if no aircraft is captured, all subsequent steps cannot be performed. Thus, how to fast and accurately capture aircrafts is the foundation and precondition for completing an aircraft docking guidance task. A fast and accurate capture algorithm can provide more accurate information and allow more process time for subsequent aircraft type identification, tracking and guidance. In order to realize fast and accurate capture of aircrafts to be docked, a stable target area is obtained, and the whole capture procedure is performed within the capture area 6 as prescribed by the scene defining. This can avoid capture of aircrafts in the whole image, and calculation amount is reduced, thereby facilitating fast capture of aircrafts. In the capture area, change detection is performed firstly, areas of moving objects are extracted, and then the areas of the moving objects are classified to determine whether the areas correspond to an aircraft to be docked, so that accurate capture of aircrafts to be docked can be realized.

Specifically, in order to capture an aircraft to be docked, the image after the preprocesses in step S2 needs to be analyzed continuously to accurately identify whether an aircraft appears.

Step S3 may include the following steps.

In step S31, a background removal step is performed.

In step S32, a shadow removal step is performed.

In step S33, an area classification step is performed.

In step S34, a feature verification step is performed.

An aircraft exists in a foreground of an image, and in order to accurately capture the aircraft from the image, the background of the image needs to be removed first to eliminate interference.

Figure 7A:
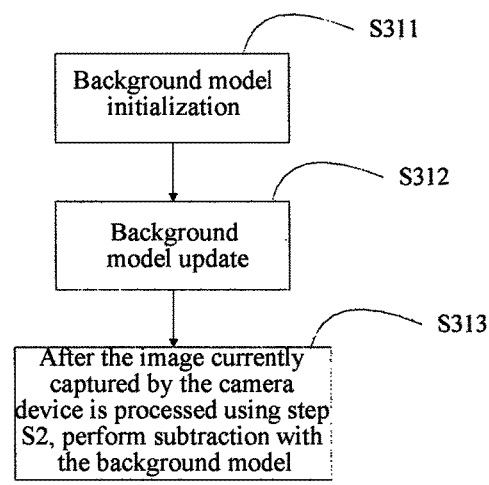
FIG. 7A is a flow chart illustratively showing background removal according to an embodiment of the present disclosure.

The background removal in step S31 uses a single-Gaussian background model to simulate a dynamic distribution of the background of the filed so as to establish a background model, and then the background is removed using a difference between the current frame and the background model. The background removal flow chart is shown in FIG. 7A.

Step S31 may include the following steps.

In step S311, background model initialization is performed.

In the present disclosure, a single-Gaussian background model is used. The single-Gaussian background model regards each pixel in the background model as one dimensional normal distribution, and pixels are independent from each other. The distribution of each pixel is determined by an average value and variance of the normal distribution of the pixel.

The background model is trained using consecutive N images after processes in step S2 to determine the average value and the variance of the Gaussian distribution. What is captured by the N images is the scene of the capture area 6 when no aircraft appears in the capture area 6. In other words, the N images are the background images. The positions captured by the N images are the same. The N images may be 50 images captured by the camera device 1001.

An average gray level $\mu_0$ of each pixel and variation $\sigma_0^2$ of gray levels of pixels in the consecutive N images f(x,y) are calculated, $\mu_0$ and $\sigma_0^2$ form an initial background image $B_0$ having a Gaussian distribution: $B_0=[\mu_0,\sigma_0^2]$, wherein:

$$\mu_0(x,y) = \frac{1}{N}\sum_{i=0}^{N-1} f_i(x,y), \text{ and}$$

$$\sigma_0^2(x,y) = \frac{1}{N}\sum_{i=0}^{N-1} [f_i(x,y) - \mu_0(x,y)]^2.$$

Next, a Gaussian model $\eta(x_i, \mu_i, \sigma_i)$ is established for each pixel point in each frame of image. The subscript i represents a frame number of an image, $x_i$ represents a current pixel value of the pixel point, $\mu_i$ represents the mean of the Gaussian model of the current pixel point, $\sigma_i$ represents the standard deviation of the Gaussian model of the current pixel point.

Then, determination is performed on $\eta(x_i, \mu_i, \sigma_i)$. If $\eta(x_i, \mu_i, \sigma_i) \leq Tp$ (Tp is a probability threshold, also called as a foreground detection threshold), the pixel point can be determined as a foreground point; otherwise, the pixel point can be determined as a background point (this situation can be called as that $x_i$ matches $\eta(x_i, \mu_i, \sigma_i)$). The collected background points constitute the background model to complete the background model initialization.

In actual applications, an equivalent threshold can be used to replace the probability threshold Tp. Assuming $d_i=|x_i-\mu_i|$, in common one dimensional situations, the foreground detection threshold is usually set according to the value of $d_i/\sigma_i$: if $d_i/\sigma_i>T$ (the value of T is between 2 and 3), the point can be determined as a foreground point; otherwise, the point can be determined as a background point.

In step S312, the background model is updated.

After step S311 is completed, if the scene changes, the background model needs to respond to these changes, and at this time, the background model needs to be updated.

The background model is updated using real time information provided by consecutive images captured by the camera device 1001 after the scene changes:

$$\mu_{i+1}=(1-\alpha)\mu_i+\alpha x_i, \sigma_{i+1}=\sqrt{(1-\alpha)\mu_i^2+\alpha d_i^2},$$

wherein α is an update rate, indicating how fast or slowly the background model is updated. If a pixel point is the background, the update rate α is set as 0.05, and if the pixel point is the foreground, the update rate α is set as 0.0025.

After step S311 is completed, if the scene does not change, step S313 can be directly performed.

In step S313, after the current image frame captured by the camera device 1001 is processed after step S2, by the subtraction with the background model, the foreground area of the current image frame is obtained.

In this step, after the subtraction step, the result obtained by the subtraction can be further processed by morphological erosion or dilation to obtain more accurate boundaries of the foreground area. The morphological erosion and dilation are known technologies in this art and can be practiced by one of ordinary skill in this art.

After removal of the background of the image, shadows in the image can be further removed in order to accurately capture aircrafts.

In the shadow removal step in step S32, firstly, gray levels of pixels in the foreground area identified after the processes of step 31 are obtained, a maximum gray level g max and a minimum gray level g min are identified, and shadow removal is performed on areas having relatively low gray levels. The areas having relatively low gray levels may refer to areas that have a gray level smaller than g min+(g max−g min)*0.5.

Each image frame may include a foreground area and a background area, which may overlap with each other, and a pixel in the foreground area may correspond to a background pixel in the background area which is at the same position.

In an area having relatively low gray level, a ratio of the gray level of each pixel to the gray level of a corresponding background pixel is calculated; if the ratio is between 0.3 to 0.9, the pixel can be regarded as a shadow point.

Next, by performing morphological erosion and dilation for many times, areas which are not shadow are removed from the set of shadow points to obtain shadow areas.

After shadow areas are removed from the foreground area, morphological erosion and dilation are performed for many times to remove holes in the foreground area which need to be removed, and individual areas are connected, so that the target area can be obtained. The target area corresponds to an object that may appear in the capture area 6, which might be an aircraft or a vehicle or other objects.

In the area classification step in step S33, a standard front aircraft area template is established in advance. Because aircrafts have a feature that two ends are narrow and the middle portion is wide, the template can be used to distinguish aircrafts and objects which are not aircrafts.

A target area is extracted by change detection, a vertical projection curve of the area is calculated. Then, a vertical projection curve of the standard front aircraft area template is calculated. Whether a correlation coefficient between the vertical projection curve of the target area and the vertical projection curve of the standard front aircraft area template is greater than a classification threshold is determined; if the correlation coefficient is greater than the classification threshold, it is determined that target area corresponds to an aircraft, and step S34 is further performed; and if the correlation coefficient is not greater than the classification threshold, it is determined that the target area does not correspond to an aircraft. The classification threshold may be 0.9, for example.

In step S33, whether the target area corresponds to an aircraft is roughly determined only according to the contour, and the feature verification step in step S34 needs to be further performed to further confirm whether the target area indeed corresponds to an aircraft. In the feature verification step, whether the target corresponds to an aircraft is verified by detecting the engines and front wheel of the captured aircraft.

Step S34 further includes the following steps.

In step S341, extremely black area extraction is performed.

A statistical gray level histogram for the target area of the current image is obtained, a maximum gray level (gmax) and a minimum gray level (gmin) within a gray level range of 1%~99% (usually gray levels of 2~253) are identified, and a gray level ratio (i.e., gmax/gmin) of the maximum gray level (gmax) to the minimum gray level (gmin) is obtained, wherein the number of pixels corresponding to the maximum gray level is not equal to zero and the number of pixels corresponding to the minimum gray level is not equal to zero. Whether it is day or night can be determined according to the ratio. According to the ratio and a preset threshold, the extremely black portion of the image is extracted to obtain an extremely black area.

Specifically, areas having a gray level between gmin and (gmax−gmin)*BlackestJudge+gmin are extracted from the image using a threshold BlackestJudge (i.e., an extremely black judgment threshold), that is the extremely black portion of the image is extracted to obtain an extremely black area.

According to the ratio of the maximum gray level (gmax) to the minimum gray level (gmin), whether the image is captured on day or night can be determined. When the ratio is greater than a standard value, it is determined that the image is captured on day, and the extremely black judgment threshold may be set as 0.05. If the ratio is not greater than the standard value, it is determined that the image is captured on night, and the extremely black judgment threshold is set as 0.5.

Figure 7B:
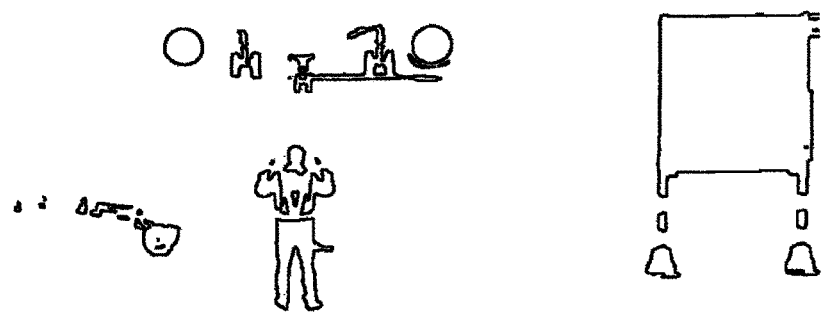
FIG. 7B is a schematic diagram illustratively showing a typical extremely black area.

An example of a typical extremely black area is shown in FIG. 7B, and the interiors of the graphics are extremely black areas.

In step S342, a quasi-circle detection is performed.

All outer boundaries of the extremely black area are extracted, and for each of the boundaries, barycentric coordinates of the boundary is calculated.

Specifically, the barycenter of the boundary can be calculated using moment of the boundary. The ji-th moment $m_{ji}$ of the boundary is defined as:

$$m_{ji} = \sum_{x,y} (f(x,y)x^j y^i),$$

wherein (x,y) represents coordinates of a pixel point, f(x,y) represents the image of the extremely black area.

The barycentric coordinates can be calculated using 00-th, 10-th and 01-th moments:

$$\tilde{x} = \frac{m_{10}}{m_{00}}, \bar{y} = \frac{m_{01}}{m_{00}}.$$

For all pixel points in a current boundary, distances between the pixel points and the barycenter are calculated. If a ratio between a calculated maximum distance and a calculated minimum distance is greater than a preset value (i.e., a circle judgment threshold which is preferably 1.5), it is determined that the area corresponding to the boundary is not circular; and if the ratio between the calculated maximum distance and the calculated minimum distance is not greater than the preset value, it is determined that the area corresponding to the boundary is circular. Based on such rule, all the boundaries are judged.

For each of those areas which are determined as circular (called as quasi-circular areas), the barycentric coordinates and the distances from the boundaries to the barycenter (i.e., the radiuses) of the area are recorded, so that the similarity determination in step S343 can be performed.

Figure 7C:
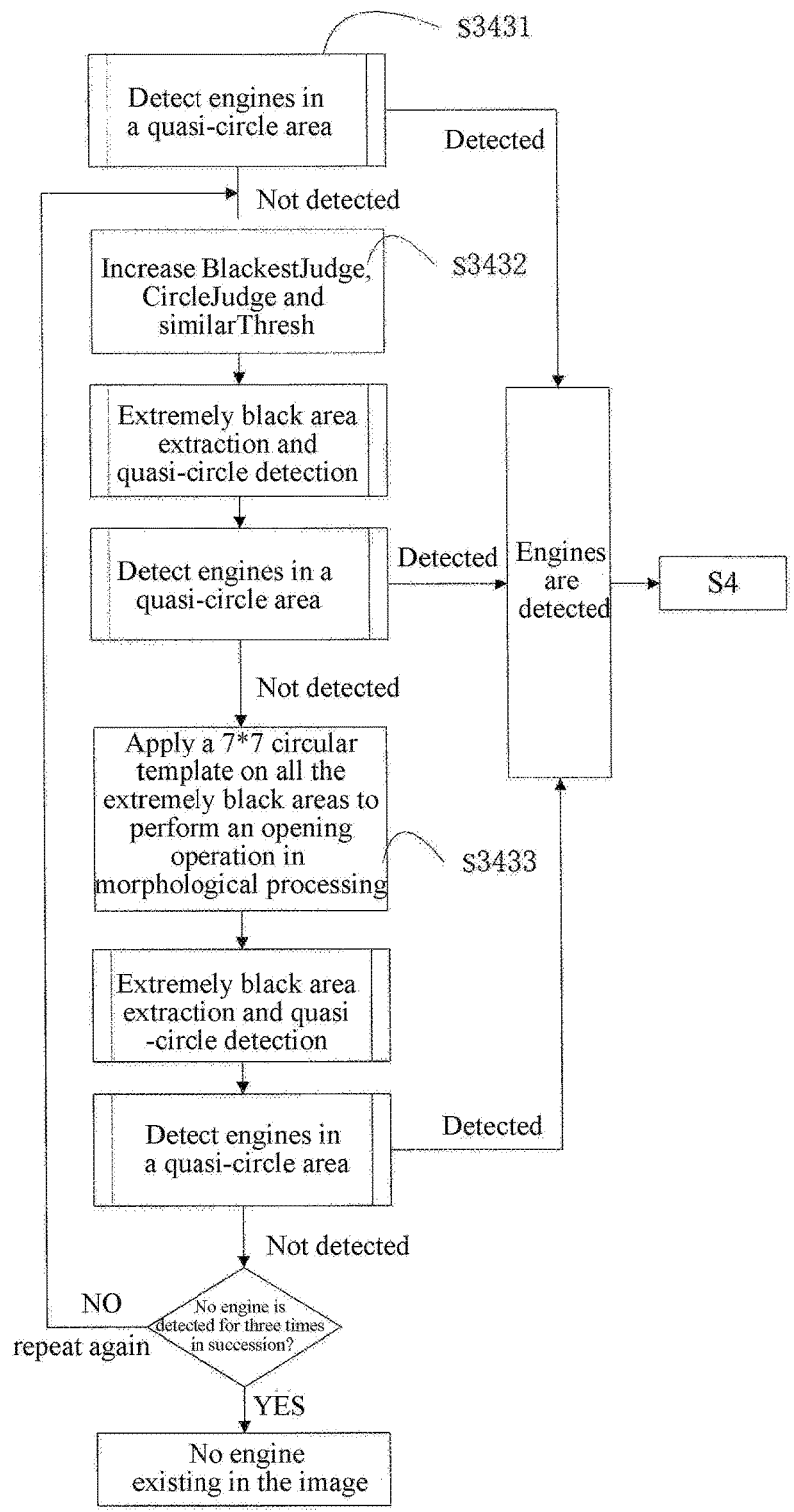
FIG. 7C is a flow chart illustratively showing similarity determination.

In step S343, a similarity determination is performed. FIG. 7C is a flow chart illustratively showing the similarity determination.

Step S343 may further include the following steps.

In S3431, by similarity calculation about the quasi-circular areas, whether there is an engine in these quasi-circular areas is determined. If there is an engine in these quasi-circular areas, step S4 is performed. If no engine exists in these quasi-circular areas, step S3432 is performed.

Assuming that a total of M quasi-circular areas are detected, and a similarity between an i-th quasi-circular area and a j-th quasi-circular area is calculated using the following equation:

Similarity$_{ij}$=|Height$_i$−Height$_j$|*|Radius$_i$−Radius$_j$|, wherein Height represents a barycenter height, Radius represents an average distance from boundaries to the barycenter (i.e., a radius).

When the similarity Similarity$_{ij}$ is smaller than a similarity threshold similarThresh (which is preferably set as 40), it is determined that the i-th quasi-circular area and the j-th quasi-circular area are engine areas. If no similarity Similarity$_{ij}$ is smaller than the threshold similarThresh, it is determined that no engine area is detected, and step S3432 is performed.

In step S3432, the threshold is adjusted, and steps S341, S342 and S3431 are repeated. If there is still no engine area detected, step S3433 is performed.

The thresholds BlackestJudge, circleJudge and similarThresh are increased, respectively. For example, thresholds BlackestJudge, circleJudge and similarThresh can be increased by 0.05, 0.5 and 20, respectively. Then, extremely black area extraction, quasi-circular detection and engine detection steps are performed. If there still is no engine area detected, step S3433 is performed.

In step S3433, a circular template is applied on all the extremely black areas to perform an opening operation in morphological process and then steps S342 and S3431 are repeated.

For example, the circular template may be a 7*7 circular template. After the opening operation, the quasi-circular detection in step S342 and the engine detection in step S3431 are performed. If there still is no engine area detected, step S3432 is performed iteratively.

If there still is no engine area detected after N iterations, it can be determined that there is no engine in the image. N may be equal to 2, for example.

When subsequent image frames are detected, if the iteration number used for the last frame is n, the iteration for the current image frame starts from n−1.

In step S344, front wheel detection is performed.

With an imaginary connection line which connects centers of the engines detected in step S343 as a bottom side and imaginary lines perpendicularly to and below the bottom side and having a length equal to four and a half diameters of each engine as another two sides, an imaginary rectangular area can be formed, and this rectangular area is taken as the searching area.

Figure 7D:
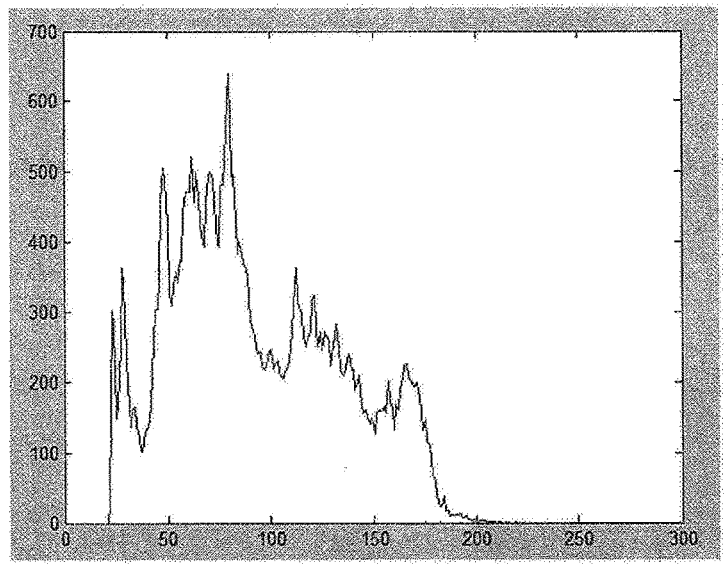
FIG. 7D is a schematic diagram illustratively showing an example of a 256 gray level histogram.

In the searching area, 256 gray levels are quantized into 64 gray levels. An example of a 256 gray level histogram is shown in FIG. 7D, and an example of quantized 64 gray level histogram.

Figure 7E:
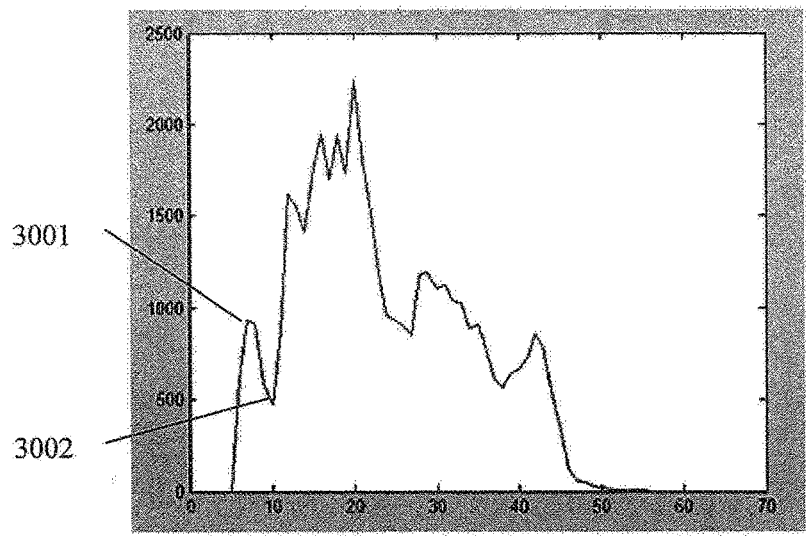
FIG. 7E is a schematic diagram illustratively showing an example of a quantized 64 gray level histogram.

For example, in FIG. 7E, a first peak 3001 and a first valley 3002 in the quantized 64 gray level histogram are searched.

Assuming that the position of the first quantized peak is peak, and the position of the first valley is valley, a best peak position BestPeak and a best valley position Best Valley in the original 256 gray level histogram are defined as:

$$BestPeak = \underset{peak*4-4 \leq i \leq peak*4+3}{\mathrm{argmax}} \{\mathrm{hist}_{256}(i)\},$$

$$BestValley = \underset{BestPeak \leq i \leq valley*4+3}{\mathrm{argmin}} \{\mathrm{hist}_{256}(i)\},$$

wherein hist$_{256}$(i) is the total number of pixels having a gray level of i in the 256 gray level histogram.

Figure 7F:
FIG. 7F is a schematic diagram illustratively showing effects after a closing operation on an image using a flat ellipse-shaped structuring element.

The gray levels are divided using BestValley. For portions which have a gray level smaller than the BestValley, desultory points having relatively a small area are removed and a closing operation is performed on the image using a flat ellipse-shaped structuring element. FIG. 7F illustratively shows the exemplary effects.

For all graphics after the closing operation, seven-order Hu moment features of boundaries are calculated, and the seven-order Hu moment features are compared with Hu moment features of a preset standard front wheel model. The Hu moment is a geometric moment proposed by Hu in 1962 (Visual pattern recognition by moment invariants), which is invariant to translation, size and rotation. Hu uses a two-order central moment and a three-order central moment to construct seven invariant moments. Thus, the seven-order of the seven-order Hu moment features is definite. If the similarity is lower than a threshold (which is preferably set as 1), it is determined that the graphic is a wheel. In this way, positions of a plurality of sets of wheels can be obtained, and the middle lower wheel is the front wheel.

Once it is determined that the engines and the front wheel are detected, it can be considered that the capture is successful. Step S4 can be performed until the capture is successful.

In step S4, an aircraft tracking step is performed.

In this step, in order to locate the aircraft in real time and obtain accurate deviation of the aircraft with respect to the guidance line, according to the big difference between the brightness of the outside walls and the brightness of the interiors of the engines and the circular structures of the engines, the positions and radiuses of the engines can be extracted, and then the front wheel of the aircraft can be found according to a space position relationship, and then the aircraft can be located.

Specifically, after an aircraft is captured, the camera device 1001 continues to capture images. If aircraft capture is realized in the last frame, for the current image frame, step S4 is directly performed after the image preprocesses in step S2. Or, after steps S2 and S3, step S4 is performed.

Because the engine positions in the last frame have been obtained using the feature verification method in step S34, the engine positions in the current frame may move very slightly. Thus, redetection on the whole image is not needed, and engine extraction of the current frame may be performed at a relatively small extended area, and the parameters (BlackestJudge, circleJudge) in the last frame can be applied in the target detection for the current frame.

Figure 8A:
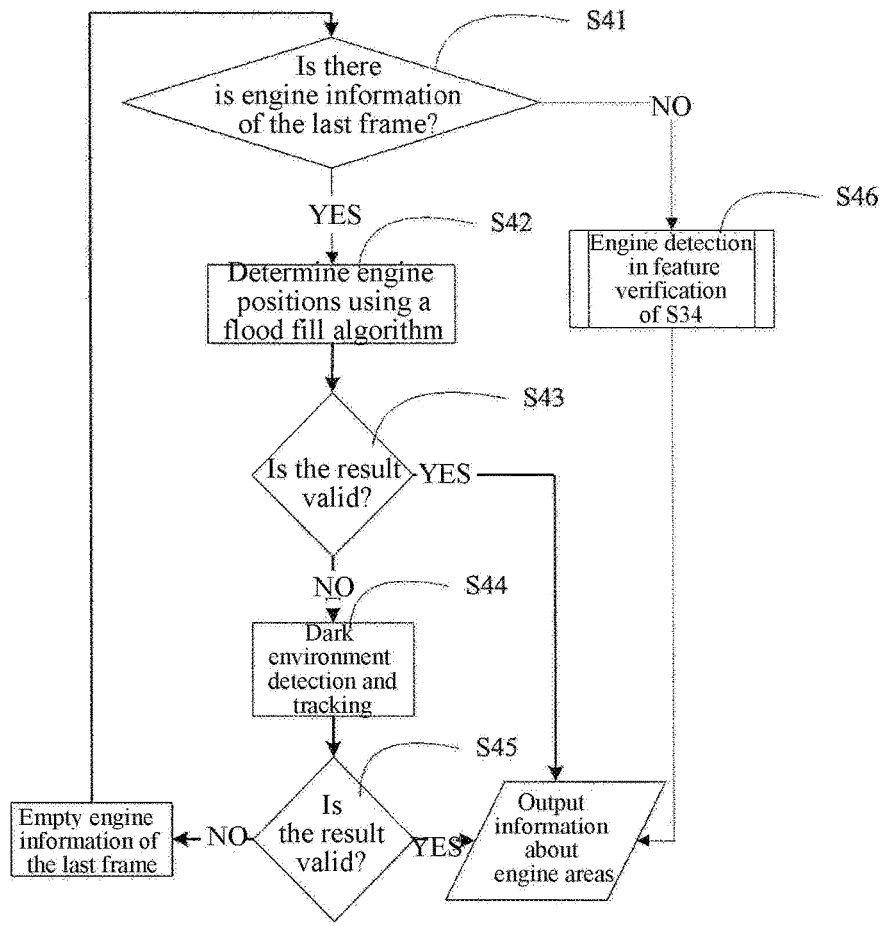
FIG. 8A is a flow chart illustratively showing an aircraft tracking step.

FIG. 8A is a flow chart illustratively showing the aircraft tracking step.

In step S41, whether there is engine information of the last frame is determined. If there is the engine information of the last frame, step S42 is performed. If there is no engine information of the last frame, step S46 is performed.

In step S42, engine positions are determined using a flood fill method.

Figure 8B:
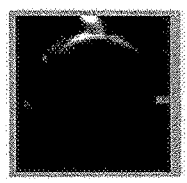
FIG. 8B is schematic diagram illustratively showing an example of aircraft engine portion.

Engines generally have outside walls of light colors, and the gray levels of the outside walls are significantly higher than that of the black areas of the interior of the engines. FIG. 8B illustratively shows a part of an engine image of an aircraft. Thus, with an engine center in the last frame as a seed point, using the flood fill method, the black area of a whole engine can be obtained.

In case of cloudy weather or low illumination, gray levels of the boundaries of an engine may not be much higher than that of the center of the engine, some noise points also exist, and thus overflow may appear when the flood fill method is used. Consequently, the result may become invalid, the obtained engine area may be overlarge, and will not be circular any more. Thus, step S43 is further performed.

In step S43, whether the fill result in step S42 is valid is determined. If the fill result is valid, step S46 is performed. If the result is not valid, step S44 is performed.

In step S44, a dark environment detection and tracking step is performed.

In this step, steps S341 and S342 are performed again using parameters when the last frame is processed to detect the engine area.

In step S45, whether the detection result is valid is determined. If the detection result is valid, information about the engine area is output. If the detection result is not valid, the engine information of the last frame is emptied, and step S41 is performed.

In step S46, the feature verification step in step S34 is performed, and information about the engine area is output.

For a sequence of images about aircraft docking, step S46 cannot be performed more than twice. In addition, after a particular number of image frames (for example, 20 frames) are detected using the dark environment detection and tracking step in step S44, the feature verification step in step S34 is used to perform detection no matter what the detection result is.

In step S47, a front wheel tracking step is performed.

After the information about the engine area is obtained, the front wheel of the aircraft is detected in this step using the front wheel detection method in step S344, so that subsequent aircraft locating step can be performed.

In step S48, a front wheel emergency process step is performed.

When the detection result obtained in step S47 is obviously wrong, for example, if the area which is determined as corresponding to the wheel has a wrong shape, or the position of the wheel obviously deviates from that in previous five to ten frames of images, according to information of the last frame of image and the current frame of image, displacement of the front wheel in the current frame is estimated based on displacement of the engines between two adjacent frames of images to obtain an estimation result as a front wheel tracking result.

In step S5, an aircraft locating step is performed. This step is used to generate right docking guidance information.

Step S5 further includes the following steps.

In step S51, a camera device calibration and image correction step is performed.

In step S52, an aircraft front wheel deviation degree calculation step is performed.

In step S53, an aircraft front wheel actual distance calculation step is performed.

By the camera device calibration procedure in step S51, geometric and optical parameters of the camera device 1001 and the orientation of the camera device 100 with respect to a world coordinate system are determined.

The camera device calibration is realized based on OpenCV. During the calibration procedure, a planar chessboard with alternating black and white colors is used as a calibration template. The camera device 1001 captures a plurality of pictures of the planar calibration template from different angles to calibrate the camera device 1001. In order to make the calibration result more accurate, during the calibration procedure, at least ten images of 7*8 or larger chessboard need to be obtained, and the calibration pictures at different angles may be captured as many as possible. The detailed process may be as follows.

In step S511, N calibration pictures are read.

In step S512, chessboard corner points are found using a function cvFindChessboardCorners( ) in OpenCV, the read N calibration pictures are brought into the function cvFindChessboardCorners( ). If finding of all corner points is successful, 1 is returned by the function, which indicates that the finding is successful, and coordinates of the corner points in an image coordinate system are obtained. If finding of all corner points is not successful, 0 is returned by the function.

In step S513, if the finding of the corner points is successful, coordinates of the corner points on the calibration template are brought into a function cvCalibrateCamera2( ), and a parameter matrix, a distortion coefficient, a rotational vector and translation vector of the camera device 1001 are returned.

Actual lenses usually have distortion of different levels, mainly including radial distortion, and slight tangential distortion. The distortion coefficient returned by the function cvCalibrateCamera2( ) includes a radial distortion coefficient and a tangential distortion coefficient, and they can be brought into the function cvUndistort2( ) in OpenCV. That is to way, the distortion of lenses can be removed mathematically.

The aircraft front wheel deviation degree calculation in step S52 is used to determine whether the front wheel of an aircraft is on the guidance line, or deviates toward left or right with respect to the guidance line.

According to the result of the front wheel tracking step in step S47, coordinates of the position of the front wheel can be obtained. Then, based on the filed defining, related position information about the guidance line and the stopping line can be obtained. Using the knowledge of relation between a middle point and a straight line in algebra, the aircraft front wheel deviation degree can be determined. Detailed steps are as follows.

The coordinates $(x_0, y_0)$ of the position of the front wheel can be obtained according to the result of the front wheel tracking. Coordinates $(x_{G1}, y_{G1})$ and $(x_{G2}, y_{G2})$ of any two points on the guidance line and coordinates $(x_{S1}, y_{S1})$ and $(x_{S2}, y_{S2})$ of any two points on the stopping line can be obtained based on the scene defining. If the x coordinates of the two points on the guidance line meet $X_{G1} = X_{G2}$, the straight line equation 1 of the guidance line 41 cannot be represented as a point-slope equation, and the straight line equation 1 at this time is: $x_1 = X_G$, and the slope of the straight line is $k_1 \to \infty$. When $X_{G1} \neq X_{G2}$, the straight line equation 1 is $y_1 = k_1 x_1 + b_1$. In a similar way, the straight line equation 2 of the stopping line 42 is $y_2 = k_2 x_2 + b_2$, and the distance from the coordinates of the position to the straight line is as follows. The coordinate system is established on the image, as can be known based on the mounting position of the camera device 1001, the x axis is from left to right, and they axis is from lower to upper, and then the amended distance equation from the point to the straight line is:

$$d = \frac{kx - y + b}{\sqrt{k^2 + 1}}.$$

Unlike commonly used distance equations, the result obtained by the above equation can be positive or negative. By bringing the coordinates $(x_0, y_0)$ of the current aircraft front wheel into the two straight line equations, $d_1$ and $d_2$ can be obtained:

$$d_1 = \begin{cases} x_0 - x_{G1}, & \text{when the straight line equation 1 is } x_1 = x_{G1} \\ \frac{k_1 x_0 - y_0 + b_1}{\sqrt{k_1^2 + 1}}, & \text{when the straight line equation 1 is } y_1 k_1 x_1 + b_1 \end{cases}$$

$$d_2 = \frac{k_2 x_0 - y_0 + b_2}{\sqrt{k_2^2 + 1}}.$$

If $d_2 \geq 0$, it is indicated that the front wheel of the aircraft runs beyond the stopping line 41; if $d_2 < 0$, it is indicated that the front wheel of the aircraft has not arrived at the stopping line 41; and at this time, if $k_1 > 0$ (including the case of $k_1 \to \infty$), $d_1 > 0$ indicates that the aircraft deviates toward left and $d_1 < 0$ indicates that the aircraft deviates toward right. If $k_1 < 0$, $d_1 < 0$ indicates that the aircraft deviates toward left, $d_1 > 0$ indicates that the aircraft deviates toward right. The deviation toward left or right is determined from pilot's viewing angle. Further, to avoid that the algorithm is over sensitive and a conclusion of "deviation from the guidance line" is reached in any cases of $d_1 \neq 0$, a judgment condition $|d_1| > \text{width}/2$ can be introduced, wherein width is a threshold which is equal to the width of the front wheel of the aircraft. When the judgment condition is met, it can be determined that the aircraft deviates from the guidance line.

The deviation can be determined according to parameters as shown in Table 1.

TABLE 1

| judgment conditions | | | deviation |
|---|---|---|---|
| $d_2 \geq 0$ | | | beyond the stopping line |
| $d_2 < 0$ | $k_1 > 0$ (including $k_1 \to +\infty$) | $d_1 < 0$ and $|d_1| > \text{width}/2$ | deviation toward right |
| | | $|d_1| \leq \text{width}/2$ | no deviation |
| | | $d_1 > 0$ and $|d_1| > \text{width}/2$ | deviation toward left |
| | $k_1 < 0$ and $k_1$ is finite | $d_1 < 0$ 且 $|d_1| > \text{width}/2$ | deviation toward left |
| | | $|d_1| \leq \text{width}/2$ | no deviation |
| | | $d_1 > 0$ and $|d_1| > \text{width}/2$ | deviation toward right |

The aircraft front wheel actual distance calculation in step S53 is used to calculate the actual distance from an aircraft to the stopping line in real time.

First, a correspondence between image coordinates and geodetic coordinates is established. A ruler on which alternating black and white stripes are arranged is laid immediately adjacent to the guidance line in the scene, and then when the scene is defined, according to the ruler, points are drawn with a maximum interval of 1 meter to obtain marking points, and the distances from each of the marking points to the first marking point in the actual scene are recorded.

The coordinates of the marking points set by the filed setting of S1 are image coordinates. For example, there are 20 points which are spaced from each other by 1 meter, the points are denoted as {point1, point2, . . . , point20} and relative coordinates of individual points with respect to an end point (point 1) on the stopping line are calculated as {relativepoint1, relativepoint2, . . . , relativepoint20}, the coordinates of relativepoint1 are (0,0), the distances of individual points from the end point relativepoint1 are {dis1, dis2, . . . , dis20}), and the actual distances of individual points from the end pointpoint1 are {0 m, 1 m, . . . 19 m}). In this way, the correspondence between {dis1, dis2, . . . , dis20} and {0 m, 1 m, . . . , 19 m} is obtained.

Figure 9:
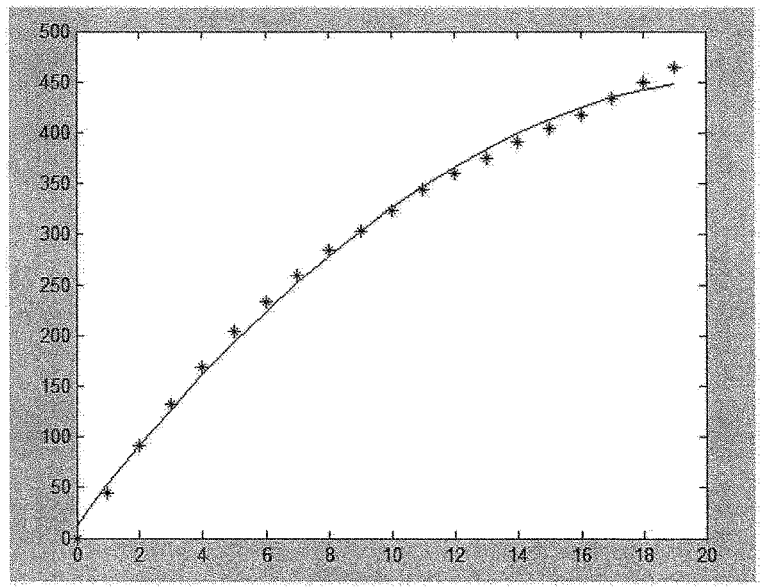
FIG. 9 is a graph illustratively showing corresponding points of actual distances and image distances and a fitting curve.

The points which are spaced from each other by the same interval on the ground manifest as a quadratic curve relationship. That is, as the distance increases, the two-point intervals form an arithmetic progression. Thus, quadratic curve fitting is conducted using the drawn points by a least square method to obtain a curve line equation $Y = ax^2 + bx + c$ wherein x is a distance on the image, and y is an actual distance. FIG. 9 is a graph illustratively showing corresponding points of actual distances and image distances and a fitting curve. In this figure, the horizontal axis represents the actual distances in meters, and the vertical axis represents image distances in pixel.

The position of the front wheel of the aircraft on the image is projected onto the guidance line along a direction of the stopping line, an Euclidean distance between the projection point and the stopping point is calculated as x, x is brought into the equation $S = ax^2 + bx + c$ to obtain y, and thereby an actual distance (in meters) from the front wheel of the aircraft to the stopping line is obtained. In this way, correct docking guidance information is generated.

Before the aircraft enters the apron, the airport sends the type information to the machine vision-based aircraft docking guidance and type identification system. After step S3 is performed, step S6 can be performed next, which is an aircraft identification and identity verification step. In this step, the type identification is verified by analyzing images. That is to say, steps S4 and S5 can be performed simultaneously with step S6.

Figure 10A:
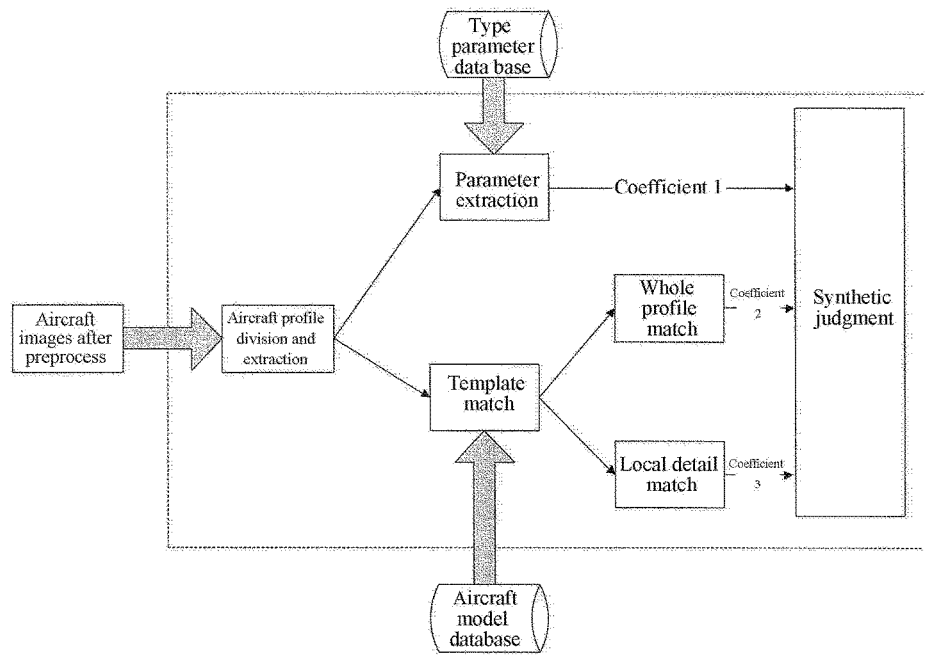
FIG. 10A is a flow chart illustratively showing an aircraft identification and verification algorithm.
Figure 10B:
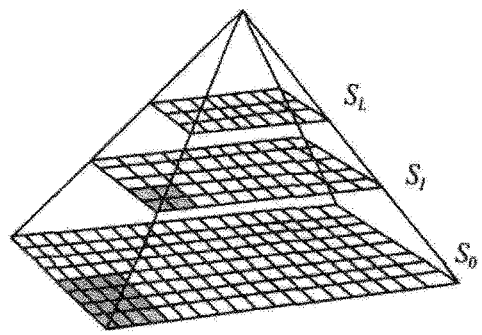
FIG. 10B is a schematic diagram illustratively showing a layered image structure.

FIG. 10A is a flow chart illustratively showing the aircraft identification and identity verification. FIG. 10B is a schematic diagram illustratively showing a layered image structure. According to an exemplary embodiment, multi-level vision feature detection from rough to fine may be used to detect the profile of the aircraft. Detailed steps can be as follows.

When i=0, the original image S0 has the highest resolution. As i increases, the image resolution decreases. When i=L, the image SL has the lowest resolution. The schematic diagram of the layered image structure is as shown in FIG. 10B. Under an environment having a large number of noises (for example, rainy, snowy or foggy weather, nights and the like), layered images having a relatively low resolution are employed. In case of sunny days, layered images having a relatively high resolution are employed to obtain a relatively high accuracy. After the aircraft area is obtained in a low resolution image and is mapped back to the original image S0, areas are divided with edges having mosaic effects.

The multi-level vision feature detection from rough to fine is used under bad weather conditions, for example rainy, snowy or foggy weather or nights. Under these weather conditions, image noises become large, and detection effects can be improved by decreasing resolution. Then the detected area is mapped back to the highest resolution to perform identification and verification of aircraft types. This is a method for detecting aircraft features under bad weather conditions, and the system automatically identifies an optimal resolution according to image quality to extract aircraft profile.

Step S6 may include the following steps.

In step S61, parameter verification is performed.

In step S62, template matching is performed.

In step S63, synthetic judgment is performed.

Step S61 further includes the following steps.

In step S611, an aircraft engine parameter in the images is extracted and compared with an aircraft engine parameter of a corresponding type which is pre-stored in a database of the system.

The extraction of the aircraft engine parameter (in pixels) can be realized using the above described step S341 to S343.

A ratio of an aircraft engine radius in the extracted aircraft engine parameter to engine radius data in a type parameter database of the aircraft which corresponds to the type information received by the system is calculated, and this ratio is called as a first ratio.

In step S612, an aircraft wing parameter in the images is extracted, and is compared with an aircraft wing parameter of the corresponding type which is pre-stored in the database.

The extraction of the aircraft wining parameter may include the following steps.

Figure 10C:
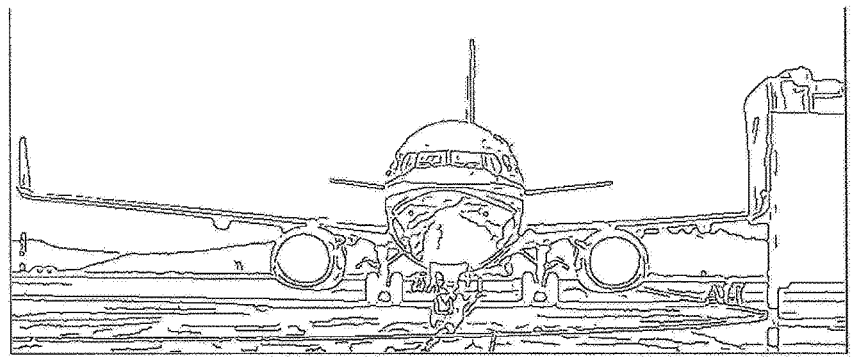
FIG. 10C is a schematic diagram illustratively showing edges of an aircraft image.

In step S6121, edges of an aircraft image are extracted using a Canny operator. Examples of edges of an aircraft are shown in FIG. 10C.

In step S6122, pixel points on the edges of the aircraft image are extracted. The pixel points are enumerated upwards along a middle axis of the aircraft engine which is at a side away from the bridge of the aircraft (the left side in FIG. 10C). For each of pixel points, straight lines with slope angles of 0 to 20 degrees are drawn, and the number of pixel points of the Canny edges which each straight lien passes through is calculated.

In step S6123, edges of the aircraft wings are determined. Two straight lines which pass through the biggest number of pixel points of the edges are taken as the edges of the aircraft wings.

In step S6124, wing tips are determined. Edge pixels at areas around the wing tips are recorded as wing tip features.

Figure 10D:
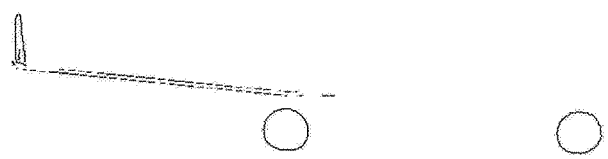
FIG. 10D is a schematic diagram illustratively showing an aircraft wing profile and an engine profile.

Examples of the wing profile and the engine profile are shown in FIG. 10D.

In step S6125, parameter comparison is performed. Lengths of aircraft wings are measured according to the positions of the wing tips, and a ratio of the lengths of the aircraft wings to aircraft wing length data in the type parameter database of the airport which corresponds to the type information received by the system is calculated. The ratio is called as a second ratio.

In step S613, an aircraft head parameter in the images is extracted, and is compared with an aircraft head parameter of the corresponding type which is pre-stored in the database.

In step S6131, boundaries of an aircraft head are determined. A middle axis position of the aircraft is determined according to the aircraft engine parameter which has been determined in the above steps. The points on the middle axis are enumerated as the center, and circles are drawn by enumerating radiuses which are two to four times of the length of the radius of the aircraft engine, and the circle which passes through the largest number of pixel points of the Canny edges is taken as the boundary of the aircraft head.

In step S6132, an aircraft head window is determined.

The window of an aircraft is usually located at the upper half of the aircraft head, and thus a depth-first search method is used to find a longest edge of the upper half of the aircraft head boundary which is not connected to the edge of the aircraft head boundary as the position wherein the window of the aircraft head is located.

In step S6133, parameter comparison is performed. The radius of the aircraft head is measured, and a ratio of the radius of the aircraft head to an aircraft head radius in the type parameter database of the airport which corresponds to the type information received by the system is calculated. The ratio is called as the third ratio. The unit of the measured radius of the aircraft head is pixel.

In step S614, an aircraft tail fin parameter in the images is extracted and is compared with aircraft tail fin parameter of the corresponding type which is pre-stored in the database.

In step S6141, using a depth-first searching method, a protruded portion is found along an upper edge of the aircraft head boundary as the tail fin of the aircraft.

In step S6142, parameter comparison is performed. A height (in pixels) of the tail fin is measured, and a ratio of the height of the tail fin to the tail fin parameter in the type parameter database of the aircraft which corresponds to the type information received by the system is calculated. The ratio is called as a fourth ratio.

In step S615, the maximum one and the minimum one among the first ratio, the second ratio, the third ratio and the fourth ratio are identified, and a ratio of the minimum one to the maximum one is calculated as the type similarity parameter, which is taken as a coefficient 1.

The template matching step S62 may include the following steps.

In step S621, global template matching is performed. With a whole image currently captured as an image to be searched and a standard aircraft image in the database of the system as a template, a global template similarity parameter is calculated. The global template similarity parameter is taken as a coefficient 2.

Figure 10E:
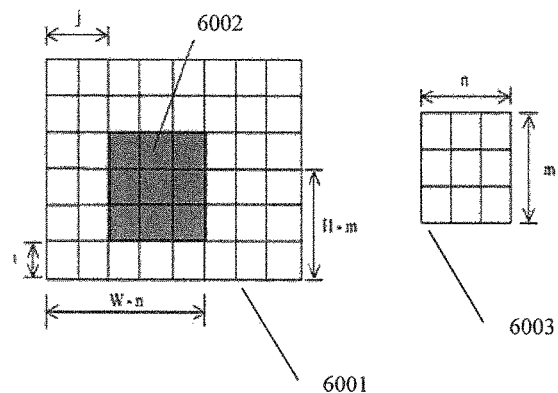
FIG. 10E is a schematic diagram illustratively showing an image S to be searched, a sub-image $S^{ij}$, a template T.

FIG. 10E illustratively shows the image S to be searched, a sub-image $S^{ij}$ and a template T. Specifically, the global template matching calculation is as follows. The image S to be searched is denoted as 6001 in this figure, with a width and a height of W*H. The sub-image $S^{ij}$ of the image S to be searched is denoted as 6002 in this figured, with a width and a height of n*m. The sub-image is spaced from the left edge of the image by j pixels, and is spaced from the lower edge of the image by i pixels. The template T is denoted as 6003 in this figure, with a width and a height of n*m. A similarity parameter R(i, j) between the template T and the sub-image $S^{ij}$ is:

$$R(i, j) = \frac{\sum_{m=1}^{M}\sum_{n=1}^{N} S^{ij}(m,n) \times T(m,n)}{\sqrt{\sum_{m=1}^{M}\sum_{n=1}^{N}[S^{ij}(m,n)]^2} \sqrt{\sum_{m=1}^{M}\sum_{n=1}^{N}[T(m,n)]^2}}$$

wherein M is a maximum value which can be obtained in the height direction of the sub-image $S^{ij}$, and N is the maximum value which can be obtained in the width of the sub-image $S^{ij}$.

A maximum value $Rmax(i_m, j_m)$ of R(i, j) is found from all the results of R(i, j), and the sub-image $S^{ij}$ corresponding to the maximum value is the matching target, and $Rmax(i_m, j_m)$ is the global template similarity parameter of the sub-image $S^{ij}$.

In step S622, local template matching is performed. With images of the aircraft engine, the aircraft wing, the aircraft head and the aircraft tail fin extracted according to steps S611 to S614 as images to be searched, and an aircraft engine, an aircraft wing, an aircraft head and an aircraft tail fin in the standard aircraft image in the type parameter database of the airport, which correspond to the type information to the type information received by the system, as templates, four similarities about the aircraft engine, the aircraft wing, the aircraft head and the aircraft tail fin are calculated using the equation in step S621. After removal of the minimum one among the four similarities, an average value of the remaining three similarities is calculated as a local template similarity parameter. The local template similarity parameter is taken as a coefficient 3.

The coefficient 1, the coefficient 2, and the coefficient 3 can be provided to the fusion module 3000 to be fused with the data obtained by the laser scanning subsystem 2000. Rather, the machine vision subsystem 1000 may independently obtain the conclusion of identify verification, and under such condition, step S63 is further performed.

In step S63, synthetic judgment is performed. If at least two of the coefficient 1, the coefficient 2, and the coefficient 3 are greater than or equal to a first verification threshold (for example, 0.85), or if all of the coefficient 1, the coefficient 2, and the coefficient 3 are greater than a second verification threshold (for example, 0.7), it can be determined that the aircraft currently captured is consistent with the type information which is obtained in advance, and the identity verification is passed; otherwise, the verification is not passed.

Next, the operating details of the laser scanning subsystem 2000 will be described below.

Figure 11:
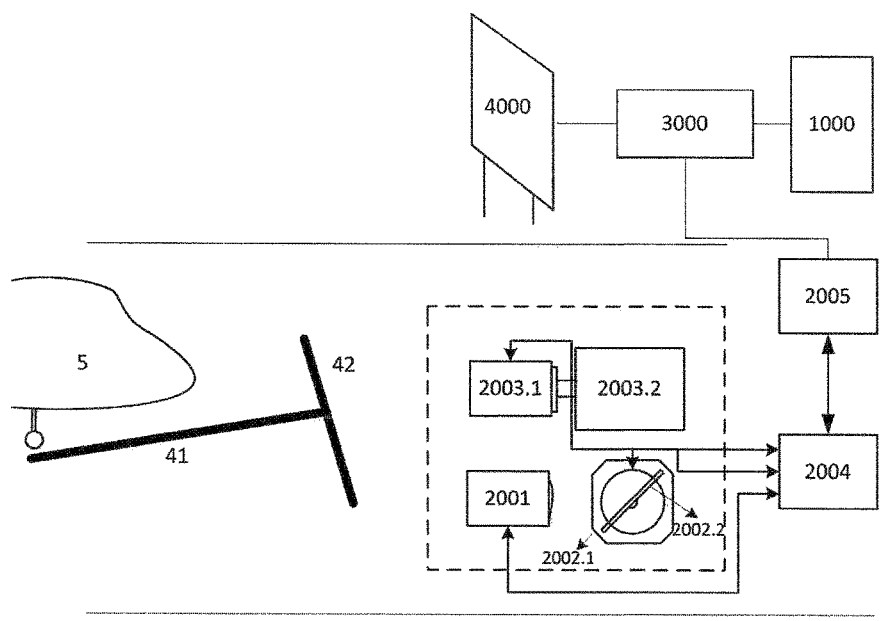
FIG. 11 is a block diagram illustratively showing a structure of a laser scanning subsystem.

FIG. 11 is a schematic diagram illustratively showing a structure of the laser scanning subsystem 2000. The laser scanning subsystem 2000 is disposed behind the stopping line 42, directly facing the head of an approaching aircraft on the extension line of the guidance line 41. An aircraft moves forward along the guidance line 41.

An intersection point of the guidance line 41 and the stopping line 42 is used as a zero point. A direction perpendicular to the guidance line 41 and in parallel with the ground is an X-axis direction, and the positive direction of the X-axis is the left hand direction with respect to the aircraft docking direction. A direction in parallel with the ground and the guidance 41 is a Y-axis direction, and the positive direction of the Y-axis is opposite to the aircraft docking direction. A direction perpendicular to the ground and the guidance line is a Z-axis direction, and the positive direction of the Z-axis is perpendicular to the ground and pointing upwards.

Like the machine vision subsystem 1000, the laser scanning subsystem 2000 needs to perform the aircraft docking scene configuration step, and the detailed procedure is the same as the previously described step S1, and repeated descriptions are omitted here.

The laser scanning subsystem 2000 includes a laser ranging device 2001, a horizontal laser scanning device 2002, a vertical laser scanning device 2003, a scanning control device 2004, and an information process unit 2005.

The laser ranging device 2001, the horizontal laser scanning device 2002, the vertical laser scanning device 2003, and the information process unit 2005 are connected with the scanning control device 2004, and the information process unit 2005 is further connected with the display device 4000.

The information process unit 2005, the central process device 1002 and the vision information and laser information fusion unit 3000 may be disposed in the same device having processing capability, or they may be independent from each other.

The laser ranging device 2001 emits laser and receives the laser which arrives at an obstacle and then is reflected back by the obstacle, and meanwhile measures a distance between a laser emitting point and the obstacle to obtain a distance value. The laser scanning device employs a dual galvanometer structure (including horizontal and vertical directions). Specifically, the horizontal laser scanning device 2002 includes a horizontal scanning stepper motor 2002.1 and a horizontal reflection mirror 2002.2, and the vertical laser scanning device 2003 includes a vertical scanning stepper motor 2003.1 and a vertical reflection mirror 2003.2. During the scanning procedure, according to a rotation angle α of the horizontal scanning stepper motor 2002.1, a rotation angle β of the vertical scanning stepper motor 2003.1 and laser ranging data 1 obtained by the laser ranging device 2001, polar coordinates of a certain point in space can be obtained.

The horizontal laser scanning in the present disclosure refers to that the horizontal scanning stepper motor 2002.1 is rotated by an angle α to drive the horizontal reflection mirror 2002.2 to be rotated by an angle α, so that the laser ranging device 2001 can perform ranging in the horizontal direction. Under such condition, the vertical scanning stepper motor 2003.1 is not rotated and only the horizontal scanning stepper motor 2002.1 is rotated, and meanwhile the laser ranging device 2001 continuously performs ranging to obtain a set of ranging data in the horizontal direction, and then a horizontal laser scan is finished.

The vertical laser scanning in the present disclosure refers to that the vertical scanning stepper motor 2003.1 is rotated by an angle β to drive the vertical reflection mirror 2003.2 to be rotated by an angle β, so that the laser ranging device 2001 can perform ranging in the vertical direction. Under such condition, the horizontal scanning stepper motor 2002.1 is not rotated and only the vertical scanning stepper motor 2003.1 is rotated, and meanwhile the laser ranging device 2001 continuously performs ranging to obtain a set of ranging data in the vertical direction, and then a vertical laser scan is finished.

The laser ranging device 2001, the horizontal laser scanning device 2002 and the vertical laser scanning device 2003 constitute a scanning system in laser scanning subsystem 2000.

The scanning control device 2004 accepts commands from the information process unit 2005 to configure and send control commands to the scanning system, and transmits the aircraft docking related data which is sampled by the scanning system to the information processing unit 2005. The information process unit 2005 processes the data, and independently displays the processed information on the display device 4000, so that pilots can adjust the traveling direction of an aircraft according to the position of the aircraft displayed on the display device 4000. Or, the information process unit 2005 may send the data to the vision information and laser information fusion unit 3000, and the data can be displayed after fusion.

In order to reflect the position information of an aircraft to be docked in real time, the scanning system and the information process unit 2005 are fast and accurate.

Figure 12:
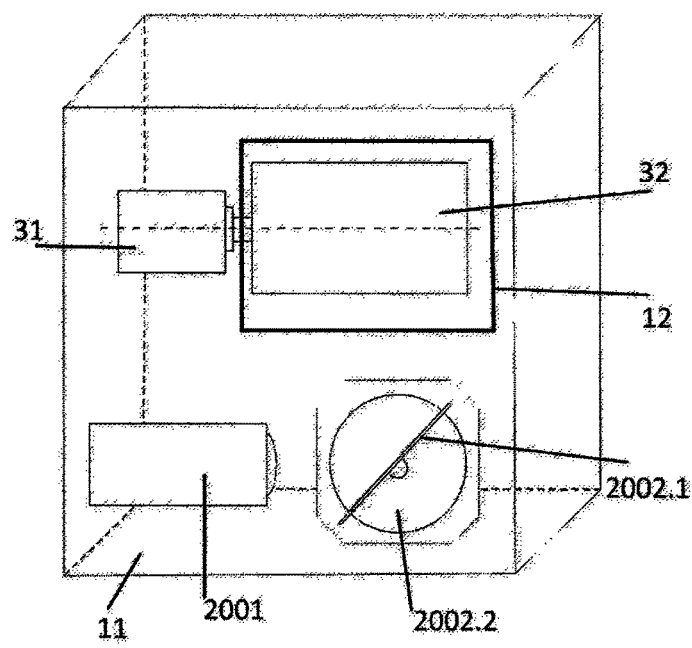
FIG. 12 is a block diagram illustratively showing a structure of a scanning system.

FIG. 12 is a block diagram illustratively showing a structure of the scanning system. Corresponding to FIG. 11, a housing 11 of the scanning system accommodates at least the laser ranging device 2001, the horizontal laser scanning device 2002 and the vertical laser scanning device 2003. The housing 11 of the scanning system is provided with a laser emitting window 12, through which the laser from the horizontal laser scanning device 2002 and the vertical laser scanning device 2003 is emitted to scan an object to be guided. The laser emitting window 12 has a fixed position relative to the horizontal laser scanning device 2002 and the vertical laser scanning device 2003.

When the laser scanning subsystem 2000 is mounted for the first time, a device mounting zero point calibration step needs to be performed so as to calibrate the zero point of the scanning system. Especially, the horizontal zero point position for the horizontal laser emitting direction of the horizontal laser scanning device 2002 and the vertical zero point position for the vertical laser emitting direction of the vertical laser scanning device 2003 need to be determined.

Horizontal Zero Point Calibration

Figure 13:
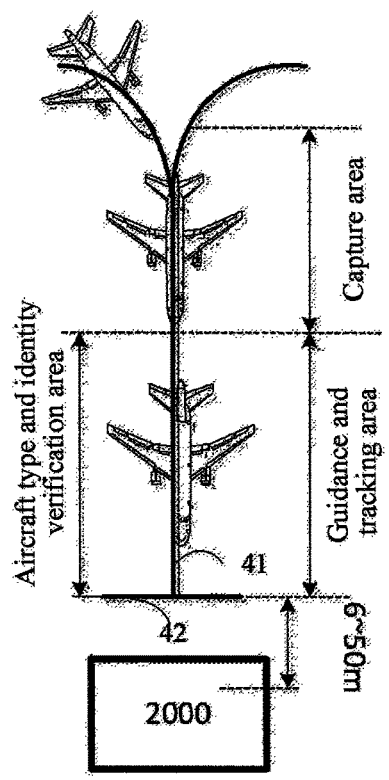
FIG. 13 is a schematic diagram illustratively showing how an aircraft docking scene is divided.
Figure 14:
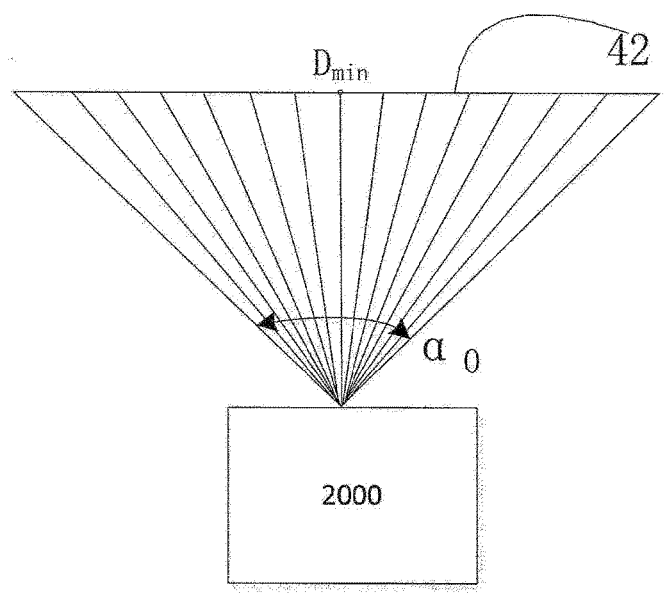
FIG. 14 is a schematic diagram illustratively showing the principle of horizontal zero point calibration.

Both the horizontal laser scanning device 2002 and the vertical laser scanning device 2003 are mounted at a height H from the ground. When the horizontal zero point position is calibrated, the vertical reflection mirror 2003.2 maintains the initial vertical scanning angle $β_0$ unchanged, and the horizontal scanning stepper motor 2002.1 drives the horizontal reflection mirror 2002.2 to horizontally scan a front calibration area on the ground with a scanning angle of $α_0$. The calibration area is a straight line for example, which is usually in front of and below the horizontal laser scanning device 2002, for example, the stopping line 42 as shown in FIG. 13. During the horizontal scanning process, the laser ranging device 2001 obtains the distance values of individual points in the calibration area in real time. FIG. 14 is a schematic diagram illustratively showing the principle of the horizontal zero point calibration.

Then, the information process unit 2005 equally divides the calibration area into N small regions, and performs distance measurement on the boundary points of each of the small regions to obtain N+1 distance values $D_n$, where n=0, 1, ..., N.

A minimum value $D_{min}$ is found among the N+1 distance values $D_n$. With the boundary point corresponding to the minimum value $D_{min}$ as a center, an extended area $D_{exe}$ is determined. For example, with the boundary point corresponding to the minimum value $D_{min}$ as the center, by shifting a preset length or degree leftwards and rightwards, the extended area can be obtained. The purpose for determining the extended area is to determine an approximate range where the horizontal zero point might exist.

The extended area is scanned again. At this time, the extended area can be divided more finely with the highest resolution, and distance measurement can be performed with respect to the divided boundary points, and a point corresponding to a minimum distance value can be identified as a horizontal zero point.

Vertical Zero Point Calibration

The calibration of the vertical zero point can be realized by scanning for two times.

First, the horizontal laser scanning device 2002 maintains static at a fixed angle, and the vertical laser scanning device 2003 conducts distance measurement at a vertical scanning angle $β_1$ to obtain first distance value $L_1$, Then, the horizontal laser scanning device 2002 still maintains static at the fixed angel, and the vertical laser scanning device 2003 conducts the distance measurement again by adjusting the vertical scanning angle upwards by an angle λ, i.e., at a vertical scanning angle $β_2$, to obtain a second distance value $L_2$. The angles $β_1$ and $β_2$ are all angles of laser with respect to the horizontal line.

Figure 15:
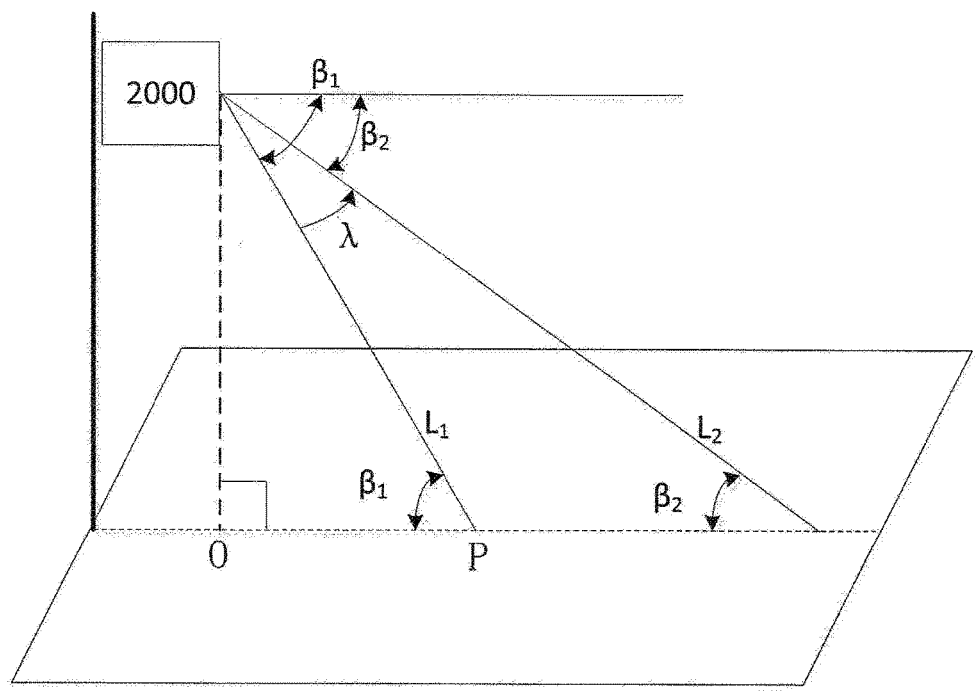
FIG. 15 is a schematic diagram illustratively showing the principle of vertical zero point calibration.

FIG. 15 is a schematic diagram illustratively showing the principle of the vertical zero point calibration. In FIG. 5, the right-angled triangle with $L_1$ as its hypotenuse, and the right-angled triangle with $L_2$ as its hypotenuse share the same side, which indicates the height value of the scanning system from the horizontal ground.

Further, $β_2=β_1-λ$, and according to the measured $L_1$ and $L_2$ and the known λ, and further in view of the equation $L_1*\sin β_1=L_2*\sin(β_1-λ)$, $β_1$ can be calculated.

In this way, a straight line where $L_1$ is located is taken as a hypotenuse, a projection line of the hypotenuse on the ground is taken as a leg, and a vertex of a right-angled triangle formed by the hypotenuse and the leg, an included angle between which is $β_1$, is taken as a vertical zero point.

Then, the horizontal and vertical zero points are calibrated, and the zero point calibration is finished.

The above described is the calibration performed when the laser scanning subsystem 2000 is mounted for the first time. Every time when the scanning system is repowered on, a zero correction step needs to be performed.

After the system is powered on again, both the horizontal scanning stepper motor 2002.1 and the vertical canning stepper motor 2003.1 may generate dithering (or vibrations). In order to minimize error caused by the dithering and increase the accuracy of the guidance system, a reference object needs to be selected to re-calibrate the zero point for laser scanning.

For example, the boundary of the laser emitting window 12 may be selected as the reference object. After the device mounting zero point calibration step is finished, the scanning system adjusts a scanning angle from a calibrated zero point step by step until a preset reference object is found, and records a scanning angle ($\alpha_r, \beta_r$) at this time as a correction angle.

Specifically, the horizontal scanning stepper motor 2002.1 and the vertical scanning stepper motor 2003.1 starts from the calibrated zero point. Taking a predetermined corner (for example, the upper left corner) of the laser emitting window 12 as an example, the vertical reflection mirror gradually goes upwards from the initial angle, and horizontal scanning is performed for each vertical scanning angle, until a distance value consistent with a preset length is obtained at a certain vertical scanning angle, and the horizontal scanning angle at that time corresponds to the position where the upper left corner of the laser emitting window 12 is, i.e., the direction of the horizontal scanning angle is towards left. The vertical scanning angle $\beta_r$, and the horizontal scanning angle $\alpha_r$ are recorded as the correction angle, and the correction angle can be hardened into a constant for recording.

When the scanning system is restarted, the horizontal scanning stepper motor 2002.1 and the vertical scanning stepper motor 2003.1 scan randomly until the preset reference object is found. Then, the scanning angles are adjusted backwards by the correction angle to find the calibrated zero point, so that subsequent capture, tracking and guidance procedure can have higher accuracy.

After the above mentioned calibration and correction procedures, the laser scanning subsystem 2000 starts to perform a capture step. The aircraft docking guidance method performed by the laser scanning subsystem 2000 in the present disclosure may generally include three steps: a capture step, a guidance step and a tracking step (also referring to FIG. 3).

In the capture step, laser scanning is conducted to horizontally scan a position where an aircraft head of an aircraft is expected to appear, pieces of echo data based on the laser scanning is obtained, and according to a judgment condition, whether the aircraft appears is determined based on the echo data.

In the guidance step, after the aircraft appears, the laser scanning is conducted to horizontally scan the aircraft head, echo data based on the laser scanning is obtained, and a position of an aircraft nose of the aircraft is determined according to the echo data.

In the tracking step, while the aircraft is traveling, the position of the aircraft nose is tracked by adjusting a vertical scanning angle of the laser scanning.

Figure 16:
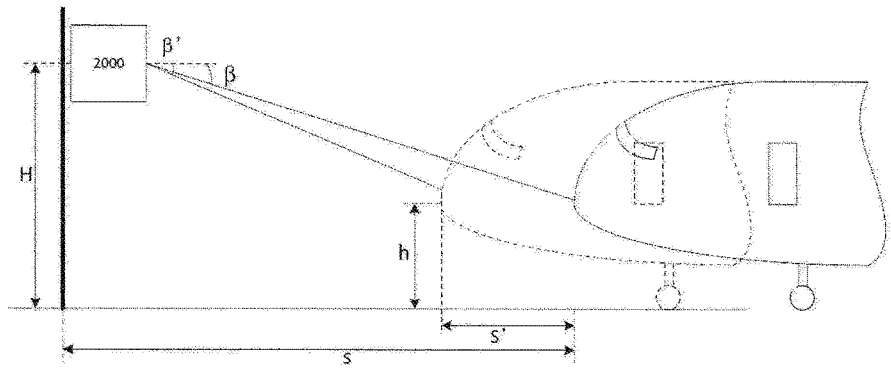
FIG. 16 is a schematic diagram illustratively showing relative positions of a laser scanning subsystem and an aircraft.

Specifically, in the capture step, referring to FIG. 16, for a particular parking position, the aircraft type or a particular aircraft which can be docked at the position is designated in advance, and then the aircraft nose height h of an aircraft which should be docked can be known in advance. The mounting height of the system 2000 is H (i.e., the system 2000 is mounted at a height of H), and a distance from the system 2000 to the farthest edge of the capture area is s according to the scene definition.

In the capture step, the scanning system horizontally scans a position where an aircraft head of an aircraft is expected to appear, obtains echo data based on the laser scanning, and according to a judgment condition, determines whether the aircraft appears based on the echo data.

Specifically, the head of an arriving aircraft is expected to appear at the farthest edge s of the capture area at a height h (i.e., the aircraft nose height). The initial scanning angle $\beta$ (an included angle with respect to the horizontal line) of the vertical laser scanning device 2003 in the system 2000 may be:

$$\beta = \arctan \frac{H-h}{s}.$$

Figure 17:
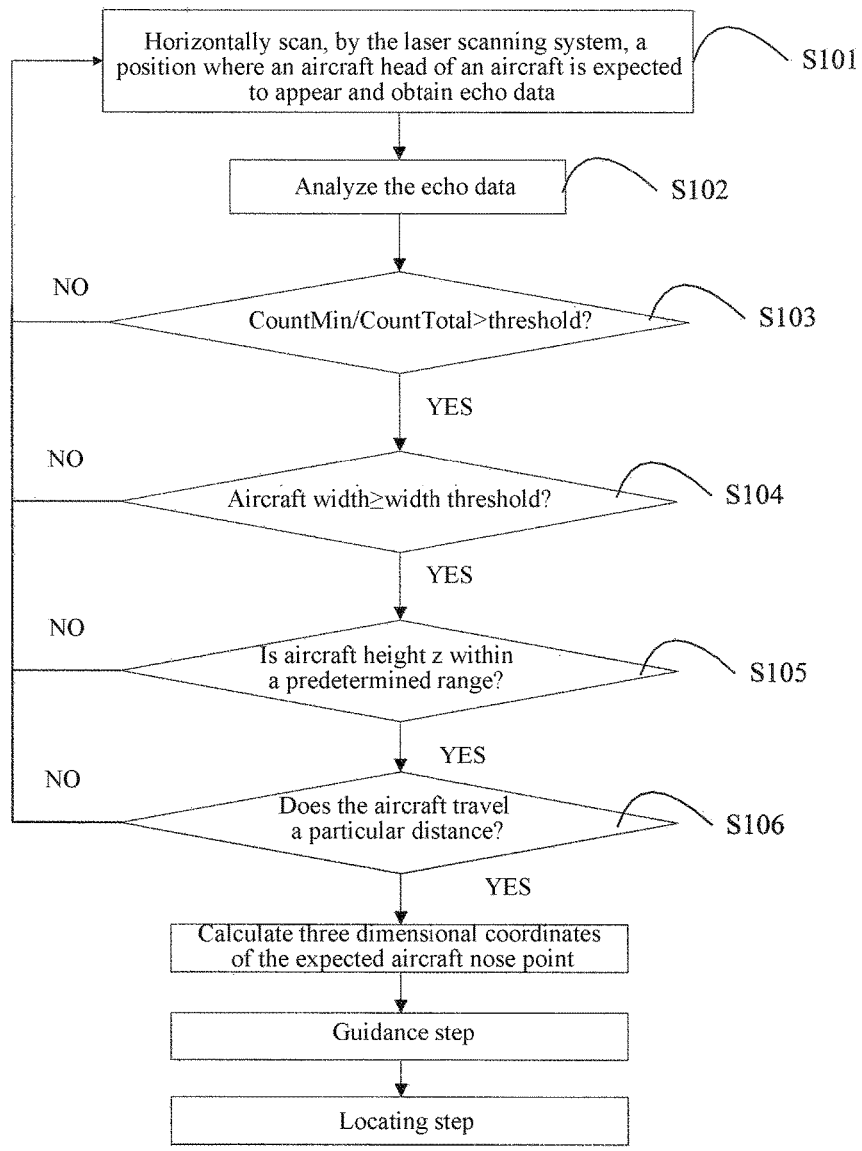
FIGS. 17 and 18 are flow charts illustratively showing a capture step performed by the laser scanning subsystem according to an embodiment of the present disclosure.
Figure 18:
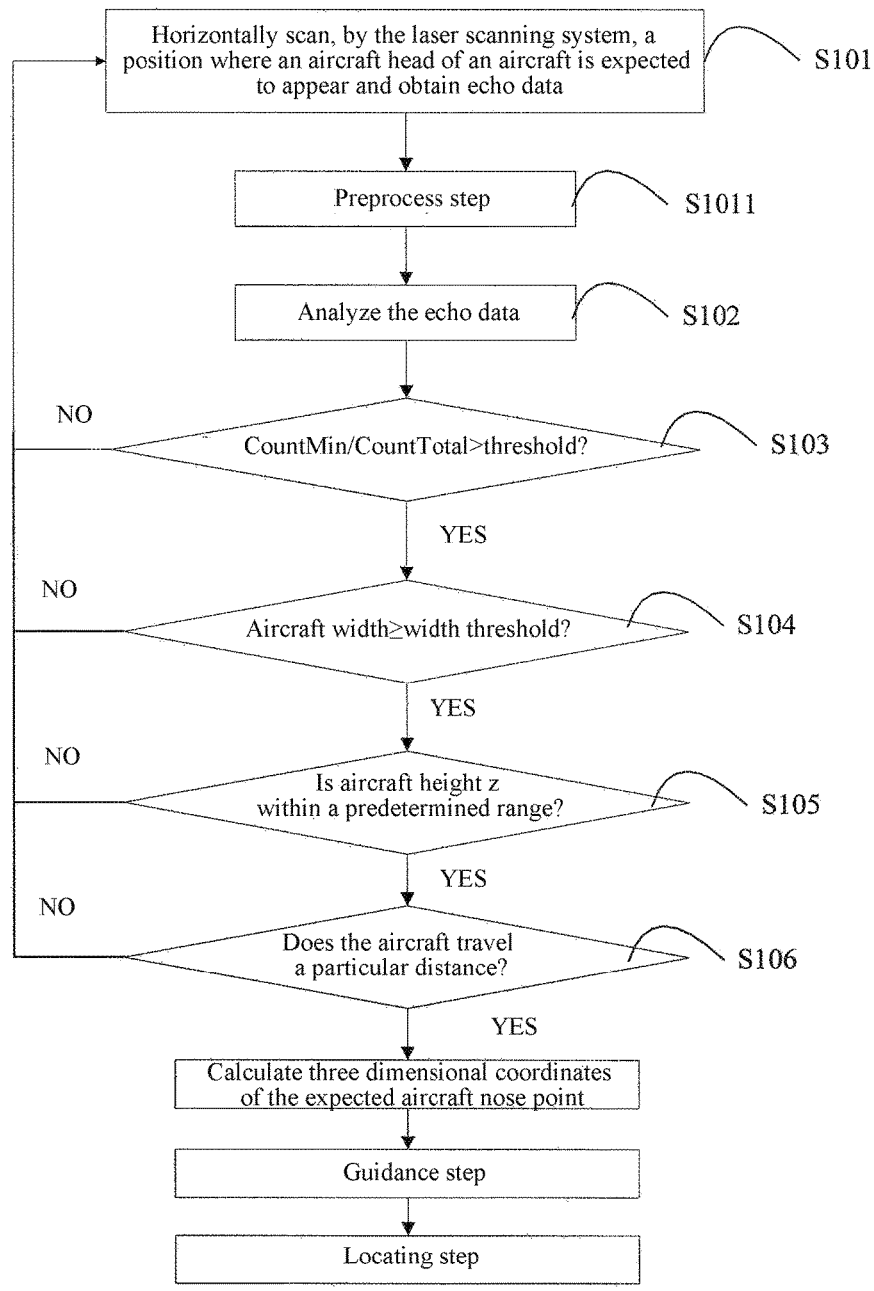

FIG. 17 is a flow chart illustratively showing the capture step in the present disclosure.

In step S101, the scanning system horizontally scans a position where an aircraft head of an aircraft is expected to appear and obtains echo data.

The scanning system continuously obtains data regarding the same row, especially the distance values of the same row. Before an aircraft appears, the data obtained by the scanning system may be wrong returned data which may exceed the farthest distance or may be results far greater than the edge distance. When an aircraft appears, the data dis_predict which the scanning system is expected to obtain is:

$$\text{dis\_predict} = \frac{H-h}{\sin\beta}.$$

In step S102, the echo data is analyzed.

The points in the echo data which are within a certain range from dis_predict can be considered as points of interest. For example, the points within the range of dis_predict±5 m can be considered as points of interest.

The total number CountTotal of the points of interest in the data regarding one row obtained after one horizontal scan is calculated.

The data regarding the row may include points of interest and points not of interest. Continuous points of interest in this row are found, and a plurality of strings of points of interest may be found. From the plurality of strings of points of interest, a string having the minimum data $L_{min}$ is identified. The point corresponding to the minimum data can be considered as the expected aircraft nose point. The total number of the points in the string having the minimum data $L_{min}$ is CountMin.

In step S103, whether CountMin/CountTotal is greater than a threshold is determine. If CountMin/CountTotal is greater than a threshold, step S104 is performed. If CountMin/CountTotal is not greater than a threshold, step S101 is performed.

The threshold may be 0.5 for example, but the present disclosure is not limited to this.

In step S104, an aircraft width is calculated based on the total number of the pieces of echo data, and whether the aircraft width is not less than a width threshold is determined. If the aircraft width is not less than a width threshold, step S105 is performed. If the aircraft width is less than a width threshold, step S101 is performed.

Each parking position is assigned with a particular type of aircraft in advance, parameters of the aircraft of this type are known. Under such condition, further determination can be made according to the width of the aircraft which is actually being docked to identify whether the aircraft currently being docked meets the parameter requirements of the predefined type, and then whether the aircraft currently being docked is the particular type of aircraft assigned in advance can be determined.

The aircraft width width_cal of the currently being docked aircraft is calculated:

width_cal=$L_{min}$*sin(CountTotal*R), where R is a type parameter, because the type can be known in advance, the type parameter is known. Depending on particular types, the type parameter may be set as 0.1125° for example.

Whether the aircraft width meets width_cal≥width*0.7 is determined, where width is the aircraft width of the particular type of aircraft. If the aircraft width meets the above condition, step S105 is performed. If the aircraft width does not meet the above condition, step S101 is performed to conduct further scanning.

In step S105, an aircraft height z is calculated and whether the calculated aircraft height is within a predetermined range is determined. If the calculated aircraft height is within a predetermined range, step S106 is performed. If the calculated aircraft height is not within a predetermined range, step S101 is performed.

As with step S104, the height data of the aircraft being docked is further determined in this step so as to accurately identify whether the aircraft currently being docked meets the parameter requirements of the predefined type of aircraft, and then whether the aircraft currently being docked is the particular type of aircraft assigned in advance can be determined.

The aircraft height z is the aircraft nose height. When the laser scanning in step S101 is performed for the first time, the point corresponding to $L_{min}$ in the obtained echo data can be considered as the expected aircraft nose point:

$$z = H - L_{min} * \sin \beta$$

Whether the aircraft height meets h−0.5 m≤z≤h+0.5 m is determined, where h is the aircraft nose height of the particular type of aircraft which is known.

If the aircraft height meets the above condition, it can be determined that the aircraft currently being docked is the particular type of aircraft, and then step S106 is further performed. If the aircraft height does not meet the above condition, step S101 is performed.

In step S106, whether the aircraft travels a particular distance is determined. If the aircraft does not travel a particular distance, step S101 is performed. If aircraft travels a particular distance, three dimensional coordinates of the expected aircraft nose point of the captured aircraft are calculated and then the subsequent guidance step and tracking step are performed.

For example, the particular distance may be 10 meters. In the present disclosure, from the time when the aircraft enters into the capture area, repeated scanning and determinations are made while the aircraft travels 10 meters. If the aircraft is consistent with the particular aircraft type and travels beyond 10 meters, the three coordinates of the expected aircraft nose point of the aircraft are obtained. After an aircraft travels the particular distance, the aircraft enters the guidance area.

The three dimensional coordinates of the expected aircraft nose point can be calculated according to the point corresponding to $L_{min}$ in the echo data obtained by the scanning system, the deflection angles β and α of the vertical and horizontal laser scanning devices corresponding to this point:

$$x = L_{min} * \sin \alpha * \cos \beta$$

$$y = L_{min} * \cos \alpha * \cos \beta$$

$$z = H - L_{min} * \sin \beta.$$

According to another embodiment, another step S1011 (i.e., a preprocess step) may be further included between steps S101 and S102.

In the preprocess step, when the echo data is obtained, median filtering is performed on the echo data and then whether the aircraft appears is determined. The preprocess step can be performed any time when echo data is received, and after the echo data is processed, subsequent step can be performed.

The purpose for preprocessing data is to ensure the effectiveness and real time performance of data. The preprocess mainly include removal of random noise points and coordinate conversion of data points. The desultory noise points can be removed from the echo data on the premise that distortion degree does not influence the judgment of aircraft position information, so as to ensure the evenness and reliability of the echo data points. Meanwhile, under the condition that the accuracy can be guaranteed, data compacting methods can be used to reduce the data transmission time by ⅓.

The one row of data obtained after one scan in step S101 can be defined as a point set P ($d_1, d_2, d_3, \ldots, d_N$), and a forward data difference is defined as $\Delta d = d_j - d_{j-1}$.

For adjacent points on a continuous curved surface, Δd is very small. Due to the existence of noise pints, assuming the value of the noise point is $d_j$, the two differences Δd between one noise point and its two neighboring points $d_1$ and $\Delta d_{j+1}$ are relatively big.

Assuming the sequence length s=5, i.e., median sequence points ($d_{j-2}, d_{j-1}, d_j, d_{j+1}, d_{j+2}$) are selected to perform filtering, where $d_j$ is the noise point.

In order to distinguish the noise points and points on different scanning planes, data needs to be rearranged. For any two adjacent laser points ($d_{j-2}, d_{j-1}, d_j, d_{j+1}, d_{j+2}$), if the values of $d_j$ and $d_{j-1}$ meet $|d_j - d_{j-1}| \geq 1$ m, ($d_{j-2}, d_{j-1}, d_j, d_{j+1}, d_{j+2}$) are arranged in an ascending order to obtain a new sequence ($d_{s-2}, d_{s-1}, d_s, d_{s+1}, d_{s+2}$), and $d_j$ is amended as the median value $d_s$ in the new sequence (i.e., $d_j = d_s$). In this way, the sharply change point $d_j$ can be filtered out and the point $d_j$ can be amended as a value which is adjacent to the point $d_j$, and the positions and values of other points in the original sequence keep unchanged.

The main steps of the median filtering include:

(1) successively comparing distance values between adjacent data points: $\Delta d = d_j - d_{j-1}$;

(2) determining whether each Δd is greater than a predetermined threshold (1 m); if one Δd is greater than the threshold, extracting a neighborhood range ($d_{j-2}, d_{j-1}, d_j, d_{j+1}, d_{j+2}$) of $d_j$;

(3) rearranging the extracted data sequence ($d_{j-2}, d_{j-1}, d_j, d_{j+1}, d_{j+2}$) in an ascending order to obtain a new sequence ($d_{s-2}, d_{s-1}, d_s, d_{s+1}, d_{s+2}$), replacing $d_j$ with the median point $d_s$, and keeping positions and values of other points in the original sequence unchanged.

In order to guarantee the stability of the median filtering, at the beginning of the iteration, the first two values can be set as equal to each other and can be assigned a value of zero ($d_0 = d_1 = 0$) during the initialization stage so as to arrive at a relatively stable median filtering iteration.

Figure 19:
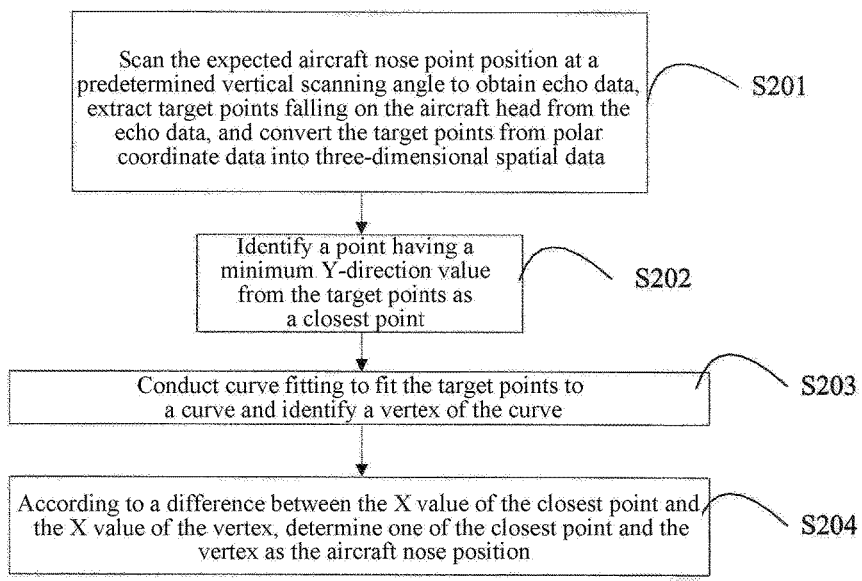
FIG. 19 is a flow chart illustratively showing a guidance step performed by the laser scanning subsystem according to an embodiment of the present disclosure.

After step S106, the guidance step is further performed. FIG. 19 is a flow chart illustratively showing the guidance step. The guidance step can include the following steps.

In step S201, after an aircraft enters into the guidance area, the expected aircraft nose point position is scanned at a predetermined vertical scanning angle to obtain echo data, target points falling on the aircraft head are extracted from the echo data, and the target points are converted from polar coordinate data into three-dimensional spatial data.

The target points can be selected based on the same principles for selecting the points of interest as mentioned above.

In step S202, a point having a minimum Y-direction value is identified from the target points as a closest point $(X_d, Y_d)$.

In step S203, curve fitting is conducted to fit the target points to a curve and a vertex of the curve is identified.

Assuming that the set of target points falling on the aircraft head is S $(p_1, p_2 \ldots p_i \ldots p_I)$, where i is the serial number of each of the target points, and I is the total number of the target points. The X-axis coordinate and Y-axis coordinate of each of the target points Pi are denoted as $(x_i, y_i)$. Second-order polynomial fitting is conducted for all the target points:

$$p(x)=a_0+a_1x+a_2x^2.$$

According to least square method, the values of $a_0$, $a_1$, and $a_2$ can be obtained.

After the quadratic curve equation is obtained, the vertex $(X_0, Y_0)$ of the curve can be identified, and the coordinates of the vertex can be denoted as $(x_{min}, y_{min})$, and this point is the aircraft nose point, wherein:

$$x_{min} = -\frac{a_1}{2a_2} \text{ and } y_{min} = \frac{4a_2a_0 - a_1^2}{4a_2}.$$

Matching of $(x_{min}, y_{min})$ against the set S of target points is conducted to identify a point which has X-axis and Y-axis coordinates which are the same as $(x_{min}, y_{min})$, and the three dimensional coordinates $(x_n, y_n, z_n)$ of the point can be formed using $(x_{min}, y_{min})$ and the Z-axis coordinate of the point.

In step S204, according to a difference between the value of $X_d$ of the closest point $(X_d, Y_d)$ and the value of $X_{min}$ of the vertex, one of the closest point and the vertex can be determined as the aircraft nose position.

For example, $\Delta X = |X_d - X_{min}|$.

Whether $\Delta X$ is smaller than a preset threshold can be determined. If $\Delta X$ is not smaller than a preset threshold, $(X_0, Y_0)$ can be taken as the aircraft point. If $\Delta X$ is smaller than a preset threshold, the closest point $(X_d, Y_d)$ can be taken as the aircraft pose point. In this way, the aircraft nose point can be located accurately. The preset threshold can be for example 50 centimeters.

Figure 20:
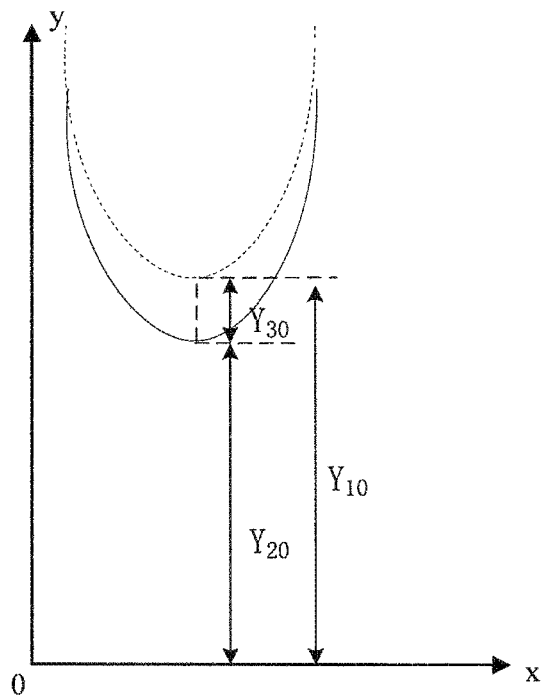
FIG. 20 is an aerial view during tracking of an aircraft.
Figure 21:
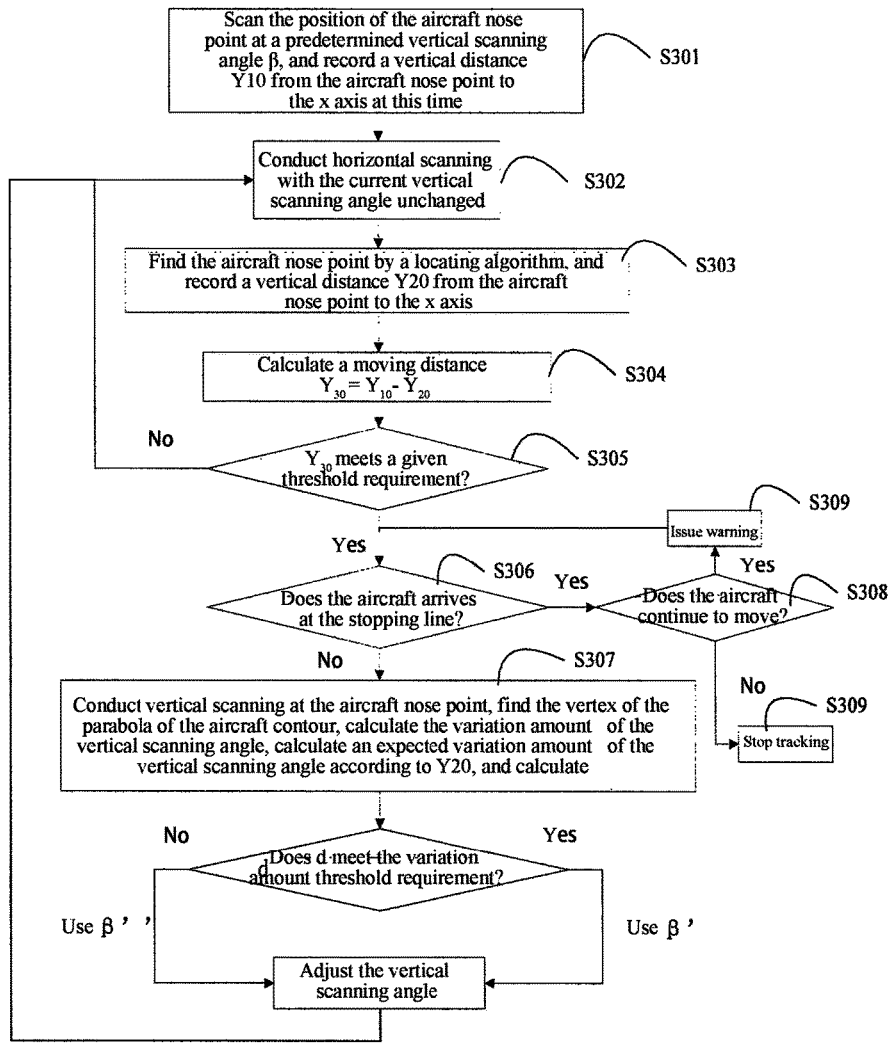
FIG. 21 is a flow chart illustratively showing a tracking step.

After the aircraft nose is located, because the aircraft moves continuously, the scanning system needs to update the position of the aircraft nose in real time to determine the real time position of the aircraft at any time. Thus, after step S204, the tracking step is further performed. FIG. 20 is an aerial view during tracking of an aircraft, and FIG. 21 is a flow chart illustratively showing the tracking step.

The tracking step may include the following steps.

In step S301, the position of the aircraft nose point is scanned at a predetermined vertical scanning angle β, and a vertical distance $Y_{10}$ from the aircraft nose point to the x axis at this time is recorded.

In step S302, as the aircraft travels forward, horizontal scanning is conducted with the current vertical scanning angle unchanged.

In step S303, the current aircraft nose point is found by a locating algorithm, a vertical distance $Y_{20}$ from the aircraft nose point to the x axis is recorded.

The locating algorithm can be as follows. When the horizontal scanning is conducted while maintaining the vertical scanning angle β, the aircraft is travelling forward, and the minimum distance value in the currently received echo data gradually decreases. The shape of the aircraft is fixed and the data about the shape of the aircraft is known, and then according to the received echo data and the known shape data of the particular type of aircraft, the specific position of the scanned aircraft when the horizontal scanning is conducted with the vertical scanning angle β unchanged. And, the position of the current aircraft nose point can be known by calculation according to the shape data of the particular type of aircraft.

In step S304, a moving distance is calculated: $Y_{30}=Y_{10}-Y_{20}$.

In step S305, whether $Y_{30}$ meets a given threshold requirement is determined. If $Y_{30}$ meets a given threshold requirement, step S306 is performed. If $Y_{30}$ does not meet a given threshold requirement, step S302 is performed.

When $Y_{10}$ is equal to or greater than 20 meters, the threshold is set as 5 meters. When $Y_{10}$ is smaller than 20 meters, the threshold is set as 1 meter. Whether $Y_{30}$ is smaller than the threshold is determined.

In step S306, whether the aircraft arrives at the stopping line is determined. If the aircraft has arrived at the stopping line, step S307 is performed.

In step S307, vertical scanning is conducted for once at the current aircraft nose point to obtain the contour of the aircraft, find the vertex of the parabola of the aircraft contour, and thereby calculate a variation amount β' of the vertical scanning angle. At the same time, an expected variation amount β" of the vertical scanning angle is calculated according to $Y_{20}$, and d=|β'-β"| is calculated. If d meets a variation amount threshold requirement, the vertical scanning angle is adjusted using β'. If d does not meet the variation amount threshold requirement, the vertical scanning angle is adjusted using β", and step S302 is performed.

The step of the vertical scanning is consistent with step S203, wherein $$\beta'' = \arctan\frac{H-h}{y_{20}} - \beta.$$

In step S308, tracking is continued for a predetermined time period, and whether the aircraft is moving is determined.

In step S309, if the aircraft is moving, warning can be issued, and step S306 is performed. If the aircraft is not moving, the tracking can be stopped.

In view of the above, the technical solutions in the present disclosure can adjust the vertical scanning angle at any time to find the actual position of the aircraft nose point at any time. Thus, tracking of the aircraft nose point are realized.

In addition to the above steps, after an aircraft enters the type identification and identity verification area, the technical solutions in the present disclosure may further include an aircraft type identification step. If it is found in the aircraft identification step that the current aircraft is not consistent with the type of the aircrafts which should be docked in at a gate, corresponding verifications conditions are not met, and then waring information can be issued. The aircraft identification may include one or more of aircraft nose height verification, aircraft cabin width verification, verification of a head aerial view profile, verification of a head side view profile and aircraft engine verification.

Depending on different requirements, the above verification conditions can be classified into different levels as follows:

Level 1—verifying whether aircraft nose height and aircraft cabin width are right;

Level 2—verifying whether aircraft nose height, aircraft cabin width, and aircraft head aerial view profile are right;

Level 3—verifying whether aircraft nose height, aircraft cabin width, aircraft head aerial view profile and aircraft head side view profile are right;

Level 4—verifying whether aircraft nose height, aircraft cabin width, aircraft head aerial view profile, aircraft head side view profile are right, and whether the number of aircraft engines and the distance between engines are right.

A higher safety level requires a stricter condition to verify whether the aircraft type and identity are right, and accordingly more time is needed. Thus, a corresponding verification level can be selected according to the length of guidance lines of aprons and the aircraft type.

Further, when engines are scanned, the position of the aircraft nose can be calculated according to the obtained positions and the relationship between relative positions of the aircraft nose and engines so as to locate the aircraft.

The aircraft nose height verification can be performed as described above with respect to step S105.

The aircraft cabin width verification can be performed as described above with respect to step S104.

The verification of the head aerial view profile may include: bringing a plurality of pieces of three dimensional echo data $(x_i, y_i, z_i)$ obtained by horizontal laser scanning into a preset aerial view profile equation of aircraft head $y=f^n(x)$, wherein the preset aerial view profile equation of aircraft head corresponds to a cross section passing through the aircraft head and nose and is in parallel with the ground, and the projection of the profile of the cross section on the ground is a curved line; calculating a horizontal fit point error $\Delta d_i^h = |f^n(x_i) - y_i|$, identifying a maximum horizontal fit error $D_H = \max(\Delta d_i^h)$, and assuming $\Delta D_H = 0.3$ m, if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation, generally, n equals to 7.

The verification of the head side view profile includes: bringing a plurality of pieces of three dimensional echo data $(x_i, y_i, z_i)$ obtained by vertical laser scanning into a preset side view profile equation of aircraft head $z=g^m(y)$, wherein the preset side view profiled equation of aircraft head corresponds to a cross section passing through the aircraft head and nose and is perpendicular to the ground, and the cross section profile is projected on a yoz plane in the coordinate system and high order curve-fitting is conducted with respect to the boundary of the curved line; calculating a vertical fit point error $\Delta d_j^v = |g^m(y_j) - z_j|$, identifying a maximum vertical fit error $D_V = \max(\Delta d_j^v)$, and assuming $\Delta D_V = 0.3$ m, if $D_V < \Delta D_V$, determining that the verification of the head side view profile is passed, wherein $\Delta D_V$ is a threshold for the verification of the head side view profile, i is the serial number of individual one of target points in the echo data, and m is the number of fittings of the side view equation, generally, m equals to 11.

The aircraft engine verification may be as follows.

In step S41, positions of engines are calculated according to the position of the aircraft nose, and laser scanning is conducted to horizontally and vertically scan the positions of the engines.

Because the type of the aircrafts which should be docked at one gate is determined, the relationship between relative positions of the aircraft nose and each of the engine is determined, and thus positions of each engine can be calculated according to the position of the aircraft nose.

For example, if the coordinate differences between the aircraft nose and an engine center is $(\Delta x_n, \Delta y_n, \Delta z_n)$ are known, and the obtained coordinates of the aircraft nose are $(x_n, y_n, z_n)$, the coordinates of a theoretic engine center are $p_{egn}$ $(x_n+\Delta x_n, y_n+\Delta y_n, z_n+\Delta z_n)$. By adjusting the deflection angle of the vertical reflection mirror 32 which reflects laser to make the laser can scan the theoretic engine center, horizontal scanning is conducted.

In step S42, the echo data obtained by the horizontal laser scanning is converted into x-y-z three dimensional coordinates, a closest coordinate point which is closest to the theoretic engine center is found, and points contiguous to the closest coordinate point are found to obtain a point set, and a distance between a leftmost point and a rightmost point in the point set is calculated as an engine width and a middle point between the leftmost point and the rightmost point is taken as a horizontal coordinate $x_{egn}$ of an engine center.

The term "contiguous" requires that the distance between adjacent points does not exceed 20 cm.

In step S43, the echo data obtained by the vertical laser scanning is converted into x-y-z three dimensional coordinates, a closest coordinate point which is closest to the theoretic engine center is found, and points contiguous to the closest coordinate point are found to obtain a point set, and a distance between a uppermost point and a lowermost point in the point set is calculated as an engine height, and a middle point between the uppermost point and the lowermost point is taken as a height $z_{egb}$ of the engine center from ground.

In step S44, if a pair of $x_{egn}$ and $z_{egb}$ can be found, it can be determined that an engine is found. By scanning different engines for a plurality of times, the number $n_{egn}$ of engines can be obtained.

In step S45, whether the number of the engines is consistent with a preset number is determined, and if the number of the engines is not consistent with the preset number, it can be determined that the aircraft engine verification is not passed.

In step S46, whether a difference between the horizontal coordinate of the engine center and a standard value exceeds a threshold or whether a difference between the height of the engine center from ground and a standard value exceeds a threshold (for example, 30 cm) is determined, and if the difference between the horizontal coordinate of the engine center and a standard value exceeds the threshold or the difference between the height of the engine center from ground and a standard value exceeds the threshold, it can be determined that the aircraft engine verification is not passed.

In step S47, whether a difference between the engine width and a standard value exceeds a threshold, or whether a difference between the engine height and a standard value exceeds a threshold (for example, 20 cm), and if the difference between the engine width and a standard value exceeds the threshold, or the difference between the engine height and a standard value exceeds the threshold, it can be determined that the aircraft engine verification is not passed.

The vision information and laser information fusion unit 3000 may fuse the docking information obtained by the machine vision subsystem 1000 and the laser scanning subsystem 2000. The fusion mainly includes a position information fusion step S3100 and an identity verification fusion step S3200.

In step S3100, the aircraft locating information obtained by the machine vision subsystem using step S5 and the aircraft position obtained by the laser scanning subsystem are fused into a new set of information.

Step S3100 may further include the following steps.

In step S3101, a difference between coordinates of the front wheel position obtained by the laser scanning subsystem 1000 and coordinates of the front wheel position obtained by the machine vision subsystem 2000 is calculated.

The machine vision subsystem 2000 may obtain the front wheel position using steps S344 or S43.

The laser scanning subsystem 1000 obtains the aircraft nose position by calculation, and then the front wheel position can be known according to the aircraft nose position because the horizontal distance from the aircraft nose to the front wheel is a known fixed value.

In step S3102, according to the difference and a fusion rule, a fusion result can be obtained.

The fusion rule may be as follows.

For a case where the front wheel of the aircraft deviates from the guidance line, whether a distance between x coordinates of position of the front wheel of the aircraft obtained by the two subsystems is smaller than or equal to a threshold. The threshold may be 20 cm for example. If the distance is smaller than or equal to the threshold, the deviation degree of the front wheel of the aircraft is given out using the result calculated by the machine vision subsystem; if the distance is greater than the threshold, smooth filtering is performed on the front wheel position obtained by the laser scanning subsystem 2000 and the front wheel position obtained by the machine vision subsystem 1000 to provide deviation information which indicates how the front wheel of the aircraft deviates from the guidance line.

For a case where there is a distance remaining from the front wheel of the aircraft to the stopping line:

Whether there is an abnormal fluctuation in the front wheel position obtained by the laser scanning subsystem; if there is not such abnormal fluctuation, the front wheel position obtained by the laser scanning subsystem is used as the distance from the front wheel of the aircraft to the stopping line; if there is such abnormal fluctuation, an average difference value of N previous difference values (for example, dozens of previous difference values) between positions of the front wheel of the aircraft obtained by the machine vision subsystem and the laser scanning subsystem is calculated, and a total of a position of the front wheel of the aircraft obtained by the machine vision subsystem this time and the average value as the distance from the front wheel of the aircraft to the stopping line.

The abnormal fluctuation may include over large horizontal changes (for example, 20 cm), abnormal changes along the direction of the guidance line (for example, the change rate is obviously greater than previous position changes, or the change is moving backward), tracking failure during tracking procedure, loss of aircrafts and so on.

In step S3200, the aircraft identity verification information obtained by the machine vision subsystem and the laser scanning subsystem is fused into a fusion result.

Step S3200 further includes the following steps.

In step S3201, a not-empty frame of discernment D={Ø,h, $\bar{h}$,H} is established using a fusion method based on D-S theory, wherein h represents that the aircraft type is right, $\bar{h}$ represents that the aircraft type is wrong, H={h,$\bar{h}$} represents that the aircraft type might be right or wrong and cannot be determined temporarily, and Ø represents an impossible event.

In step S3202, a mass function of the machine vision subsystem and a mass function of the laser scanning subsystem are established, wherein $m_1(\bullet)$ represents the mass function of the machine vision subsystem, and $m_2(\bullet)$ represents the mass function of the laser scanning subsystem, and the following condition is met:

$m_1(\emptyset)=0$, $m_2(\emptyset)=0$, $\Sigma m_1(\bullet)=1$, $\Sigma m_2(\bullet)=1$, wherein $$m_1(h) = \prod_{i=1}^{3}  \text{coefficient } i,$$

$$m_1(\bar{h}) = \prod_{i=1}^{3} (1 - \text{coefficient } i),$$

coefficient 1, coefficient 2, and coefficient 3 are known values which have already obtained by the machine vision subsystem, $m_2(h)$ and $m_2(\bar{h})$ change according to a priority determination sequence preset by the laser scanning subsystem. When a certain level of identity verification is passed and higher level of identity verification is not conducted, $m_1(h)$ increases as the level which has been passed rises, and $m_1(\bar{h})$ decreases as the level which has been passed rises. When a certain level of identity verification is passed and higher level of identity verification is not passed, $m_1(h)$ decreases as the level which has been passed rises, and $m_1(\bar{h})$ rises as the level which has been passed rises. Typical empirical values may be:

$$m_1(h), m_1(\bar{h}) = \begin{cases} 0.1, 0.8 & \text{(Level 1 is not passed)} \\ 0.6, 0.2 & \text{(Level 1 is passed, Level 2 is not conducted)} \\ 0.3, 0.5 & \text{(Level 1 is passed, Level 2 is not passed)} \\ 0.8, 0.1 & \text{(Level 2 is passed, Level 3 is not conducted)} \\ 0.4, 0.4 & \text{(Level 2 is passed, Level 3 is not passed)} \\ 0.9, 0.05 & \text{(Level 3 is passed, Level 4 is not conducted)} \\ 0.5, 0.3 & \text{(Level 3 is passed, Level 4 is not passed)} \\ 0.95, 0 & \text{(Level 4 is passed)} \end{cases}$$

In step S3203, an orthogonal sum of the mass functions is calculated:

$$m(h) = \frac{\sum_{x \cap y = h} m_1(x) m_2(y)}{1 - K},$$

wherein $$k = \sum_{x \cap y = \emptyset} m_1(x) m_2(y);$$

if:

$$\begin{cases} m(h) - m(\bar{h}) > \varepsilon_1 \\ m(H) < \varepsilon_2 \\ m(h) > m(H) \end{cases},$$

wherein $\varepsilon_1$ and $\varepsilon_2$ are preset thresholds, for example, $\varepsilon_1=0.3$ and $\varepsilon_2=0.2$, h is the judgment result. Then, a fusion result which indicates that the aircraft type is right and the identity verification is passed is generated.

If:

$$\begin{cases} m(\bar{h}) - m(h) > \varepsilon_1 \\ m(H) < \varepsilon_2 \\ m(\bar{h}) > m(H) \end{cases},$$

a fusion result $\bar{h}$ which indicates that the aircraft type is wrong and the identity verification is not passed is generated.

Then, information display step may be performed to send the fusion result to the display device 4000 for display.

The display device 4000 may be a large display screen which is mounted at an airport for pilots to view during aircraft docking procedure. Also, the display device 4000 may be used for airport crew to view situations of aircrafts.

Figure 22:
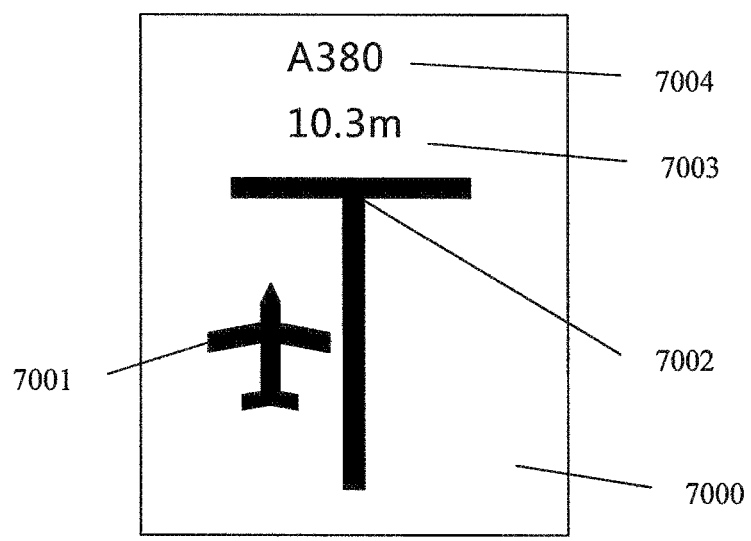
FIG. 22 is a schematic diagram illustratively showing an example of a possible displaying manner on a display device.

FIG. 22 is a schematic diagram illustratively showing an example of a possible displaying manner on the display device 4000.

In this figure, 7000 represents an area on the display device 4000 which is used for displaying guidance information, 7002 represents a "T" shape formed by the guidance line and the stopping line, so that the relative positions of aircrafts with respect to the guidance line and the stopping line can be shown.

The present disclosure does not impose specific limitations on display details, but needs to display specific positions of aircrafts, which is important in aircraft guidance, for example, information indicating whether the aircraft deviates toward left or right (7001), the distance 7003 remaining to the stopping line, and also the aircraft type 7004 which needs to be verified during aircraft identification and verification procedure.

In this way, pilots can view the moving path of aircrafts, and thus safety for aircraft docking can be improved.

In the present disclosure, two subsystems obtain docking information independently, and the docking information are fused to obtain final results about the deviation of front wheel and identity verification. While aircraft docking guidance is realized, accuracy in determination of deviation of front wheel and identity verification during the aircraft docking procedure can be effectively improved.

Also, the aircraft docking guidance and type identification systems and methods have effective intelligent information capability, and can effectively capture, track and locate aircrafts and verify identity during aircraft docking procedure. Also, the methods and systems have visual monitoring functions which can be applied in intelligent aprons, and can effectively improve automation, intelligence and operation management levels of civil aviation airports.

What is claimed is:

1. An aircraft docking guidance and type identification method, performed by an aircraft docking guidance and type identification system which comprises a machine vision subsystem, a laser scanning subsystem and a fusion module, wherein the method comprises:

obtaining images, by the machine vision subsystem, through image capturing and obtaining a first position of a front wheel of an aircraft by calculation based on the images;

obtaining a position of an aircraft nose of the aircraft, by the laser scanning subsystem, by means of laser scanning, and obtaining a second position of the front wheel of the aircraft by calculation; and performing fusion with respect to the first position and the second position of the front wheel of the aircraft according to a fusion rule to identify deviation of the front wheel of the aircraft wherein the fusion rule comprises:

for a case where the front wheel of the aircraft deviates from a guidance line:

determining whether a distance between x coordinates of the first position and the second position of the front wheel of the aircraft is smaller than or equal to a threshold; if the distance is smaller than or equal to the threshold, obtaining the deviation degree of the front wheel of the aircraft calculated by the machine vision subsystem; if the distance is greater than the threshold, performing smooth filtering on the first position and the second position of the front wheel of the aircraft to provide deviation information which indicates how the front wheel of the aircraft deviates from the guidance line;

for a case where there is a distance remaining from the front wheel of the aircraft to a stopping line:

determining whether there is an abnormal fluctuation in the second position of the front wheel of the aircraft; if there is not such abnormal fluctuation, obtaining the second position of the front wheel of the aircraft as the distance remaining from the front wheel of the aircraft to the stopping line; if there is such abnormal fluctuation, obtaining an average difference value of N previous difference values between positions of the front wheel of the aircraft obtained by the machine vision subsystem and the laser scanning subsystem, and calculating a total of a position of the front wheel of the aircraft obtained by the machine vision subsystem this time and the average difference value as the distance remaining from the front wheel of the aircraft to the stopping line.

2. The method according to claim 1, wherein the step of obtaining images further comprises:

performing an aircraft docking scene setting step to divide a monitoring scene into different information process functional areas;

performing an image preprocess step to perform preprocess on the captured images;

performing an aircraft capture step to recognize engines and the front wheel of the aircraft from the images so as to conform that an aircraft appears in the images;

performing an aircraft tracking step to continuously track the images of the engines and the front wheel of the aircraft captured in the aircraft capture step and update the images of the engines and the front wheel of the aircraft in real time;

performing an aircraft locating step to locate the aircraft in real time and accurately determine a deviation degree of the aircraft with respect to a guidance line and how far the aircraft is from a stopping line;

wherein the image preprocess step further comprises:
determining whether the images belong to a low illumination image, a high illumination image or a normal illumination image according to average gray levels of the images, performing a low illumination image process on low illumination images, and performing a high illumination image process on high illumination images;
determining whether each of the normal illumination images is a normal image according to a variance of the image; and
for images which are not normal images, determining whether each of the images is an image of rain or snow or an image of fog, performing a rain-or-snow-image process step on the image of rain or snow, and performing a fog-image process step on the image of fog.

3. The method according to claim 2, wherein the low illumination image process comprises:

$$g(x,y)=f(x,y)+af(255-f(x,y))$$

wherein f (x, y) represents an original image, (x, y) are coordinates of individual pixel points in the image, g (x, y) represents the processed image, and a is a low illumination image process parameter;
or wherein the rain-or-snow-image process step comprises:
finding pixels to be processed which are corrupted by rain or snow using a photometric model;
for pixels to be processed in a current image, extracting brightness values of corresponding pixels in preceding and succeeding images which are adjacent to the current image, determining whether the corresponding pixels in the preceding and succeeding images which are adjacent to the current image are pixels to be processed according to the brightness values;
if the corresponding pixels in the preceding and succeeding images which are adjacent to the current image are pixels to be processed, obtaining an average value of brightness values of all pixels which are adjacent to the pixels to be processed in the current image, and replacing the brightness values of the pixels to be processed in the current image with the average value; and
if the corresponding pixels in the preceding and succeeding images which are adjacent to the current image are not pixels to be processed, replacing the brightness values of the pixels to be processed in the current image with a minimum value among the brightness values of the corresponding pixels in the preceding and succeeding images which are adjacent to the current image or an average value of two minimum values among the brightness values of the corresponding pixels in the preceding and succeeding images which are adjacent to the current image;
or wherein the fog-image process step is performed by homomorphic filtering.

4. The method according to claim 2, wherein the aircraft capture step further comprises:
performing a background removal step to simulate a dynamic distribution of background of the filed using a single-Gaussian background model to establish a background model, and removing the background using a difference between current images and the background model to obtain a foreground area;
performing a shadow removal step to calculate gray levels of the foreground area to identify a maximum gray level g max and a minimum gray level g min, and perform a shadow removal on an area which has a gray level smaller than T=g min+(g max−g min)*0.5;
performing an area classification step, establishing a standard front aircraft area template, extracting a target area by change detection, calculating a vertical projection curve of the area, calculating a correlation coefficient between the vertical projection curve and a vertical projection curve of the standard front aircraft area template, and if the correlation coefficient is greater than or equals to a classification threshold, determining that the target area corresponds to an aircraft; and
performing a feature verification step to further verify whether the target area corresponds to the aircraft by detecting the engines and the front wheel of the captured aircraft.

5. The method according to claim 4, wherein the feature verification step further comprises:
(a) performing an extremely black area extraction step to obtain a statistical gray level histogram for the target area of the current image, identify a maximum gray level and a minimum gray level within a gray level range of 1%~99%, and extract the most black portion of the image based on a preset extremely black judgment threshold, the maximum gray level and the minimum gray level to obtain an extremely black area;
(b) performing quasi-circle detection to extract all outer boundaries of the extremely black area, and for each of the boundaries, calculate barycentric coordinates of the boundary using moment of the boundary, wherein the ji-th moment of the boundary is defined as:

$$m_{ji} = \sum_{x,y}(f(x,y)\cdot x^j y^i)$$

wherein the barycentric coordinates $(\bar{x},\bar{y})$ are:

$$\bar{x} = \frac{m_{10}}{m_{00}}, \bar{y} = \frac{m_{01}}{m_{00}},$$

and for all pixel points in a current boundary, calculate distances between the pixel points and the barycenter; if a ratio between a calculated maximum distance and a calculated minimum distance is greater than a circle judgment threshold, determine that the area is not circular, and proceed to conduct determination of a next area; and if the ratio is not greater than the circle judgment threshold, determine that the area is quasi-circular, and record the barycentric coordinates and the radius of the area;
(c) detecting the engines of the aircraft in the quasi-circular area by similarity determination; and
(d) detecting the front wheel of the aircraft to obtain the first position of the aircraft.

6. The method according to claim 5, wherein in step (c), for M detected quasi-circular areas, a similarity Similarity$_{ij}$, between a i-th quasi-circular area and a j-th quasi-circular area is:

$$Similarity_{ij}=|Height_i-Height_j|*|Radius_i-Radius_j|$$

wherein height represents a barycenter height, Radius represent a radius, and when the similarity Similarity$_{ij}$ is smaller than a preset similarity threshold, it is determined that the i-th quasi-circular area and the j-th quasi-circular area correspond to engines of the aircrafts.

7. The method according to claim 6, wherein in step (c), if no aircraft engine is detected, iterative detection is performed to perform steps (a) to (c) by increasing the extremely black judgment threshold, the circle judgment threshold, and the similarity threshold; if there still is no aircraft engine detected, a 7*7 circular template is applied on all the extremely black areas to perform an opening operation and then steps (b) to (c) are performed;
if there still is no aircraft engine detected, the iterative detection is performed for twice; and
if there still is no aircraft engine detected, it is determined that there is no engine existing in the image.

8. The method according to claim 7, wherein the extremely black judgment threshold, the circle judgment threshold, and the similarity threshold are increased by 0.05, 0.5 and 20, respectively.

9. The method according to claim 5, wherein step (d) further comprises:
in an searching area of the image, quantizing 256 gray levels into 64 gray levels, searching a first peak and a first valley in the quantized 64 gray level histogram, wherein a best peak position BestPeak and a best valley position BestValley in the original 256 gray level histogram are defined as:

$$BestPeak = \underset{peak*4-4 \leq i \leq peak*4+3}{\arg\max} \{hist_{256}(i)\}$$

$$BestValley = \underset{BestPeak \leq i \leq valley*4+3}{\arg\min} \{hist_{256}(i)\}$$

wherein hist256(i) is the total number of pixels having a gray level of i in the 256 gray level histogram;
dividing the gray levels using BestValley, and for portions which have a gray level smaller than the BestValley, removing desultory points having relatively a small area and performing a closing operation on the image using a flat ellipse-shaped structuring element; and
for all graphics, calculating seven-order Hu moment features of boundaries, comparing the seven-order Hu moment features with moment features of a preset standard front wheel model, and if similarity is lower than a threshold, determining a middle graphic is the front wheel;
or wherein the aircraft tracking step further comprises:
after obtaining positions of engines in the last frame of image, performing tracking using a flood fill algorithm to determine an engine area in a current frame;
if a fill result in the step of performing tracking is not valid, performing a dark environment detection and tracking step to conduct steps (a) and (b) using parameters for the last frame to detect and track the engine area;
after obtaining information regarding the engine area, detecting the front wheel of the aircraft using step (d) to obtain the first position of the front wheel of the aircraft;
performing a front wheel emergency process step: when detecting that a shape of the front wheel is not correct or that a position of the front wheel obviously deviates from that in previous frames of images, according to information of the last frame of image and the current frame of image, estimating displacement of the front wheel in the current frame based on displacement of the engines between two adjacent frames of images to obtain an estimation result as a front wheel tracking result; if no front wheel can be detected after more than N frames of images, outputting error information;
wherein the aircraft locating step comprises:
performing a camera device calibration and image correction step to determine a correspondence between optical parameters of a camera device and a geographic coordinate system;
performing an aircraft front wheel deviation degree calculation step; and
performing an aircraft front wheel actual distance calculation step;
wherein the camera device calibration and image correction step further comprises:
reading N calibration pictures;
finding chessboard corner points using a function cvFindChessboardCorners( ) in OpenCV, bringing the read N calibration pictures into the function cvFindChessboardCorners( ); if finding of all corner points is successful, returning 1 by the function, and obtaining coordinates of the corner points in an image coordinate system; if finding of all corner points is not successful, returning 0 by the function; and
bringing coordinates of the successfully found corner points on a calibration template into a function cvCalibrateCamera2( ), and returning a parameter matrix, a distortion coefficient, a rotational vector and translation vector of the camera device.

10. The method according to claim 9, wherein the aircraft front wheel deviation degree calculation step further comprises:
according to the first position $(x_0, y_0)$ of the front wheel of the aircraft obtained in the step of detecting the front wheel of the aircraft, using a relationship between coordinates of the position and the guidance and stopping lines, obtaining a straight line equation of the guidance line as $y_1 = k_1 x_1 + b_1$, and a straight line equation of the stopping line as $y_2 = k_2 x_2 + b_2$, wherein a distance from the coordinates of the position to a straight line is:

$$d = \frac{kx - y + b}{\sqrt{k^2 + 1}};$$

and
bringing $(x_0, y_0)$ into the two straight line equations to obtain $d_1$ and $d_2$; wherein if $d_2 \geq 0$, it is indicated that the front wheel of the aircraft runs beyond the stopping line; if $d_2 < 0$, it is indicated that the front wheel of the aircraft has not arrived at the stopping line; and at this time, if $k_1 > 0$, $d_1 > 0$ indicates that the aircraft deviates toward left and $d_1 < 0$ indicates that the aircraft deviates toward right; and if $k_1 < 0$, $d_1 < 0$ indicates that the aircraft deviates toward left, $d_1 > 0$ indicates that the aircraft deviates toward right.

11. The method according to claim 10, wherein the aircraft front wheel deviation degree calculation step further comprises:
determining whether $|d_1| > width/2$, wherein width is a threshold equal to a width of the front wheel of the detected aircraft;

if |d₁|>width/2, determining that the aircraft deviates from the guidance line.

12. The method according to claim 9, wherein the aircraft front wheel actual distance calculation step further comprises:
establishing a correspondence between image coordinates and geodetic coordinates;
obtaining image coordinates of calibration points used during the filed setting in the aircraft docking scene setting step, conducting quadratic curve fitting using the image coordinates by a least square method to obtain a curve line equation $y=ax^2+bx+c$, wherein x is a distance on an image, y is an actual distance;
projecting the position of the front wheel of the aircraft on the image onto the guidance line along a direction of the stopping line, calculating an Euclidean distance between a projection point and a stopping point as x, and obtaining an actual distance from the front wheel of the aircraft to the stopping line using $y=ax^2+bx+c$.

13. The method according to claim 2, wherein the method further comprises an aircraft identification and identity verification step performed after the aircraft capture step and which comprises:
performing parameter verification: extracting aircraft parameters in the images, and comparing the aircraft parameters with type data which is pre-stored in a database to obtain a type similarity parameter;
performing template matching: comparing the images with type templates which are pre-stored in the database to obtain a template similarity parameter; and
performing a synthetic judgment: when the type similarity parameter and the template similarity are greater than or equal to a verification threshold, determining that identity verification is passed.

14. The method according to claim 13, wherein the parameter verification step further comprises:
(a) extracting an aircraft engine parameter in the images, and comparing the aircraft engine parameter with an aircraft engine parameter of a corresponding type which is pre-stored in the database to obtain a first ratio;
(b) extracting an aircraft wing parameter in the images, and comparing the aircraft wining parameter with an aircraft wing parameter of the corresponding type which is pre-stored in the database to obtain a second ratio;
(c) extracting an aircraft head parameter in the images, and comparing the aircraft head parameter with an aircraft head parameter of the corresponding type which is pre-stored in the database to obtain a third ratio;
(d) extracting an aircraft tail fin parameter in the images, and comparing the aircraft tail fin parameter with an aircraft tail fin parameter of the corresponding type which is pre-stored in the database to obtain a fourth ratio; and
(e) identifying the maximum one and the minimum one among the first ratio, the second ratio, the third ratio and the fourth ratio, and calculating a ratio of the minimum one to the maximum one as the type similarity parameter;
wherein the template matching step further comprises:
performing global template matching: with a whole image as an image to be searched and a standard aircraft image as a template, calculating a global template similarity parameter; and
performing local template matching: with images of an aircraft engine, an aircraft wing, an aircraft head and an aircraft tail fin extracted according to steps (a) to (d) as images to be searched, and an aircraft engine, an aircraft wing, an aircraft head and an aircraft tail fin in the standard aircraft image as templates, calculating four similarities between the images to be searched and the templates, removing the minimum one among the four similarities and calculating an average value of the remaining three similarities as a local template similarity parameter;
wherein the synthetic judgment step further comprises:
if at least two of the type similarity parameter, the global template similarity parameter and the local template similarity parameter are greater than or equal to a first verification threshold, determining that the identity verification is passed; or
if all of the type similarity parameter, the global template similarity parameter and the local template similarity parameter are greater than a second verification threshold, determining that the identity verification is passed.

15. The method according to claim 1, wherein the step of obtaining a position of an aircraft nose of the aircraft further comprises:
in a capture step, conducting laser scanning to horizontally scan a position where an aircraft head of an aircraft is expected to appear, obtaining pieces of echo data based on the laser scanning, and according to a judgment condition, determining whether the aircraft appears based on the echo data;
in a locating step, after the aircraft appears, conducting the laser scanning to horizontally scan the aircraft head, obtaining the echo data based on the laser scanning, and determining a position of an aircraft nose of the aircraft according to the echo data; and
in a tracking and guidance step, while the aircraft is traveling, tracking the position of the aircraft nose by adjusting a vertical scanning angle of the laser scanning.

16. The method according to claim 15, wherein prior to the capture step, the method further comprises a zero point calibration step which comprises a device mounting zero point calibration step performed when the laser scanning system is first installed, wherein the device mounting zero point calibration step comprises:
a horizontal zero point measurement step which comprises:
horizontally scanning, by the scanning system, a calibration area on the ground with a vertical scanning angle fixed, wherein the calibration area is divided equally into N small regions; measuring distances from a boundary point of each of the small regions, and finding a minimum value among the obtained distance values; determining an extended area with a boundary point corresponding to the minimum value as a center; and identifying a point corresponding to a minimum distance value as a horizontal zero point; and
a vertical zero point measurement step which comprises:
conducting distance measurement at a vertical scanning angle $\beta_1$ by the scanning system to obtain a first distance value $L_1$, conducting the distance measurement again by adjusting the vertical scanning angle $\beta_1$ by an angle λ to obtain a second distance value $L_2$, and calculating $\beta_1$ using the following equation:

$$L_1 * \sin \beta_1 = L_2 * \sin(\beta_1 - \lambda)$$

wherein a straight line where L1 is located is taken as a hypotenuse, a projection line of the hypotenuse on the ground is taken as a leg, and a vertex of a right-angled triangle formed by the hypotenuse and the leg, an included angle between which is $\beta_1$, is taken as a vertical zero point;

wherein the zero point calibration step further comprises a zero point correction step which comprises:

after the device mounting zero point calibration step is finished, adjusting a scanning angle of the scanning system from a zero point step by step until a preset reference object is found, and recording a scanning angle at this time as a correction angle; and when the scanning system is restarted, adjusting the scanning angle backwards by the correction angle to find the zero point after the preset reference object is found by the scanning system.

17. The method according to claim 15, wherein the judgment condition further comprises:

determining whether a ratio of the number of points of interest, which are continuous and one of which corresponds to a minimum distance value, to the total number of the pieces of echo data is greater than a threshold;

calculating an aircraft width based on the total number of the echo data, and determining whether the aircraft width is not less than a width threshold; and calculating an aircraft height and determining whether the calculated aircraft height is within a predetermined range;

wherein the distance values of the points of interest are within a specified range at two sides of a prediction length;

or wherein in the capture step, when the echo data is obtained, median filtering is performed on the echo data and then whether the aircraft appears is determined;

or wherein the locating step further comprises:

extracting from the echo data target points falling on the aircraft head, and converting the target points from polar coordinate data into three-dimensional spatial data;

identifying from the target points a point having a minimum Y-direction value as a closest point;

conducting curve fitting to fit the target points to a curve and identify a vertex of the curve; and determining one of the closest point and the vertex as the position of the aircraft nose according to a difference between an X-value of the closest point and an X-value of the vertex;

or wherein the tracking and guidance step further comprises:

scanning the position of the aircraft nose at a predetermined vertical scanning angle while the aircraft is travelling;

calculating a current aircraft nose point according to the echo data; and vertically scanning the current aircraft nose point, and calculating a variation amount of the vertical scanning angle according to a vertex of a obtained parabola according to the scanning, and changing the vertical scanning angle according to the variation amount, or calculating the variation amount of the vertical scanning angle according to the current aircraft nose point and changing the vertical scanning angle according to the variation amount;

or wherein the method further comprises an aircraft type identification step;

wherein the aircraft type identification step comprises one or more of aircraft nose height verification, aircraft cabin width verification, verification of a head aerial view profile, verification of a head side view profile and aircraft engine verification;

the aircraft nose height verification comprises: if a difference between the aircraft nose height and a preset aircraft nose height is within a preset range, determining that the aircraft nose height verification is passed;

the aircraft cabin width verification comprises: finding two points from the echo data, a difference between X coordinates of which is the maximum, with a straight line distance between the two points as an aircraft cabin width, if the aircraft cabin width is greater than a product of a theoretic aircraft cabin width and a width coefficient, determining that the aircraft cabin width verification is passed;

the verification of the head aerial view profile comprises: bringing the echo data $(x_i, y_i, z_i)$ obtained by horizontal laser scanning into a preset side view profile equation $y=f''(x)$, calculating a horizontal fit point error $\Delta d_i^h = |f''(x_i) - y_i|$, identifying a maximum horizontal fit error $D_H = \max(\Delta d_i^h)$, and if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation;

the verification of the head side view profile comprises: bringing the echo data $(x_i, y_i, z)$ obtained by vertical laser scanning into a preset side view profile equation $z=g^m(y)$, calculating a vertical fit point error $\Delta d_j^v = |g^m(y_i) - z_i|$, identifying a maximum vertical fit error $D_v = \max(\Delta d_j^v)$, and if $D_v < \Delta D_v$, determining that the verification of the head side view profile is passed, wherein $\Delta D_v$ is a threshold for the verification of the head side view profile, i is the serial number of individual one of target points in the echo data, and m is the number of fittings of the side view profile equation;

the aircraft engine verification comprises:

calculating positions of engines according to the position of the aircraft nose, and conducting laser scanning to horizontally and vertically scan the positions of the engines;

converting the echo data obtained by the horizontal scanning into x-y-z three dimensional coordinates, finding a closest coordinate point which is closest to a theoretic engine center, and finding points contiguous to the closest coordinate point to obtain a point set, and calculating a distance between a leftmost point and a rightmost point in the point set as an engine width and a middle point between the leftmost point and the rightmost point as a horizontal coordinate of an engine center;

converting the echo data obtained by the vertical scanning into x-y-z three dimensional coordinates, finding a closest coordinate point which is closest to the theoretic engine center, and finding points contiguous to the closest coordinate point to obtain a point set, and calculating a distance between a uppermost point and a lowermost point in the point set as an engine height, and a middle point between the uppermost point and the lowermost point as a height of the engine center from ground;

determining whether the number of the engines is consistent with a preset number, and if the number of the engines is not consistent with the preset number, determining that the aircraft engine verification is not passed;

determining whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determining that the aircraft engine verification is not passed;

determining whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determining that the aircraft engine verification is not passed.

18. The method according to claim 1, wherein the fusion rule further comprises:

establishing a not-empty frame of discernment D={Ø,h, $\bar{h}$,H} using a fusion method based on D-S theory, wherein h represents that the aircraft type is right, $\bar{h}$ represents that the aircraft type is wrong, H ={$\bar{h}$} represents that the aircraft type might be right or wrong and cannot be determined temporarily, and Ø represents an impossible event;

establishing a mass function $m_1(\bullet)$ of the machine vision subsystem and a mass function $m_2(\bullet)$ of the laser scanning subsystem, and the following condition is met:
$m_1(\emptyset)=0$, $m_2(\emptyset)=0, \Sigma m_1(\bullet)=1, \Sigma m_2(\bullet)=1$, $$m_1(h) = \prod_{i=1}^{3}$$

wherein
coefficient i, $$m_1(\bar{h}) = \prod_{i=1}^{3} (1 - \text{coefficient } i),$$

$m_2(h)$ and $m_2(\bar{h})$ change according to a priority determination sequence preset by the laser scanning subsystem;

calculating an orthogonal sum of the mass functions:

$$m(h) = \frac{\sum_{x \cap y = h} m_1(x) m_2(y)}{1 - K},$$

wherein $$k = \sum_{x \cap y = \emptyset} m_1(x) m_2(y);$$

if:

$$\begin{cases} m(h) - m(\bar{h}) > \varepsilon_1 \\ m(H) < \varepsilon_2 \\ m(h) > m(H) \end{cases},$$

wherein $\varepsilon_1$ and $\varepsilon_2$ are preset thresholds, generating a fusion result which indicates that the aircraft type is right and the identity verification is passed;

if:

$$\begin{cases} m(\bar{h}) - m(h) > \varepsilon_1 \\ m(H) < \varepsilon_2 \\ m(\bar{h}) > m(H) \end{cases},$$

generating a fusion result which indicates that the aircraft type is wrong and the identity verification is not passed.

19. An aircraft docking guidance and type identification device, comprising:

a machine vision subsystem configured to obtain images, through image capturing and obtain a first position of a front wheel of an aircraft by calculation based on the images;

a laser scanning subsystem configured to obtain a position of an aircraft nose of the aircraft by means of laser scanning, and obtain a second position of the front wheel of the aircraft by calculation; and a fusion device configured to perform fusion with respect to the first position and the second position of the front wheel of the aircraft according to a fusion rule to identify deviation of the front wheel of the aircraft, wherein the fusion rule comprises:

for a case where the front wheel of the aircraft deviates from a guidance line:

determining whether a distance between x coordinates of the first position and the second position of the front wheel of the aircraft is smaller than or equal to a threshold; if the distance is smaller than or equal to the threshold, obtaining the deviation degree of the front wheel of the aircraft calculated by the machine vision subsystem; if the distance is greater than the threshold, performing smooth filtering on the first position and the second position of the front wheel of the aircraft to provide deviation information which indicates how the front wheel of the aircraft deviates from the guidance line;

for a case where there is a distance remaining from the front wheel of the aircraft to a stopping line:

determining whether there is an abnormal fluctuation in the second position of the front wheel of the aircraft; if there is not such abnormal fluctuation, obtaining the second position of the front wheel of the aircraft as the distance remaining from the front wheel of the aircraft to the stopping line; if there is such abnormal fluctuation, obtaining an average difference value of N previous difference values between positions of the front wheel of the aircraft obtained by the machine vision subsystem and the laser scanning subsystem, and calculating a total of a position of the front wheel of the aircraft obtained by the machine vision subsystem this time and the average difference value as the distance remaining from the front wheel of the aircraft to the stopping line.

\* \* \* \* \*